US006272132B1

(12) United States Patent
Ofek et al.

(10) Patent No.: US 6,272,132 B1
(45) Date of Patent: *Aug. 7, 2001

(54) ASYNCHRONOUS PACKET SWITCHING WITH COMMON TIME REFERENCE

(75) Inventors: Yoram Ofek, Riverdale, NY (US); Nachum Shacham, Palo Alto, CA (US)

(73) Assignee: Synchrodyne Networks, Inc.

(*) Notice: Subject to any disclaimer, the term of this patent is extended or adjusted under 35 U.S.C. 154(b) by 0 days.

This patent is subject to a terminal disclaimer.

(21) Appl. No.: 09/120,944

(22) Filed: Jul. 22, 1998

Related U.S. Application Data

(60) Provisional application No. 60/088,891, filed on Jun. 11, 1998.

(51) Int. Cl.[7] .................................................. H04L 12/56
(52) U.S. Cl. .............................................. 370/389; 370/392
(58) Field of Search ........................................ 370/230, 235, 370/252, 253, 389, 397, 395, 396, 399, 392, 352, 353, 356, 413, 465, 401, 503, 517

(56) References Cited

U.S. PATENT DOCUMENTS

| 4,821,259 | 4/1989 | DeBruler et al. ............... 370/60 |
|---|---|---|
| 5,418,779 | 5/1995 | Yemini et al. ................... 370/54 |
| 5,442,636 | 8/1995 | Bontekoe ........................ 370/108 |
| 5,455,701 | 10/1995 | Eng et al. ....................... 359/135 |
| 5,623,483 | 4/1997 | Agrawal et al. ................ 370/253 |
| 5,859,835 | * 1/1999 | Varma et al. ................... 370/229 |
| 6,038,230 | * 3/2000 | Ofek .............................. 370/389 |
| 6,122,274 | * 9/2000 | Kumar ............................ 370/388 |
| 6,144,662 | * 11/2000 | Colmant et al. ................ 370/390 |

OTHER PUBLICATIONS

Ballart et al., "SONET: Now It's The Standard Optical Network", *IEEE Communications Magazine*, vol. 29, No. 3, Mar. 1989, pp. 8–15.

Boyle et al., "The COPS (Common Open Policy Service) Protocol", Internet Draft. <draft–ietf–rapcops–01.txt>. Mar. 1998.

R. Braden, "Resource ReSerVation Protocol (RSVP)—Version 1 Functional Specifications", *IETF Request for Comment RFC2205*, Sep. 1997.

P.Dana, "Global Positioning System (GPS) Time Dissemination for Real–Time Application", *Real Time Systems*, Kluwer Academic Publishers, Boston, 1997, pp 9–40.

M. Decina, "TMN Today: Challenges and Opportunities", *Telecommunications Network Management Into The 21st Century*, IEEE Press, New York, 1994, pp. xv–xvii.

(List continued on next page.)

Primary Examiner—Alpus H. Hsu
Assistant Examiner—Duc Ho
(74) Attorney, Agent, or Firm—Sitrick & Sitrick

(57) ABSTRACT

The invention describes a method for transmitting and forwarding packets over a packet switching network. The switches of the network maintain a common time reference, which is obtained either from an external source (such as GPS—Global Positioning System) or is generated and distributed internally. The time intervals are arranged in simple periodicity and complex periodicity (like seconds and minutes of a clock). A packet that arrives to an input port of a switch, is switched to an output port based on specific routing information in the packet header (e.g., IPv4 destination address in the Internet, VCI/VPI labels in ATM). Each switch along a route from a source to a destination forwards packets in periodic time intervals that are predefined using the common time reference. The time interval duration can be longer than the time duration required for transmitting a packet, in which case the exact position of a packet in the time interval is not predetermined.

76 Claims, 23 Drawing Sheets

OTHER PUBLICATIONS

S. Deering, "Multicast Routing In Datagram Internetwork", Ph.D. Thesis, Stanford University, Dec. 1991, pp. 1–36.

S. Deering, "Host Extensions For IP Multicasting", *IETF Request for Comment RFC1112*, Aug. 1989.

Demers et al., "Analysis and Simulation Of A Fair Queuing Algorithm", *ACM Computer Communication Review (SIGCOMM'89)*, pp 1–12, 1989.

T.Earnest, "GPS Times Isochronous ATM Cells", *Electronic Engineering Times*, Feb. 13, 1995, p. 54.

Ferrari et al., "A Scheme For Real–Time Channel Establishment In Wide–Area Networks", *IEEE Journal on Selected Areas in Communication*, vol. 8, No. 3, Apr. 1990, pp. 368–379.

S.J. Golestani, "Congestion–Free Communication In High–Speed Packet Networks", *IEEE Transactions on Communications*, vol. 39, No. 12, Dec. 1991, pp. 1802–1812.

Handley et al, "SIP–Session Initiation Protocol", <draft–draft–ietf–mmusic–sip–04.ps>, Nov. 1997.

Händel et al.,"Signalling", *ATM Networks: Concepts, Protocols, and Applications*, (2nd Ed.) Addison–Wesley, Publishing Co., 1994, Chapter 6, pp. 141–158.

Hennessy et al., "Enhancing Performance with Pipelining", *Computer Organization & Design: The Hardware/Software Interface*, Morgan Kaufman Publishers, San Manteo, CA, 1994, Chapter 6, pp. 364–389.

C. Huitema, "Why is RIP So Simple?", *Routing Int The Internet*, Prentice Hall, 1995, chapter 4, pp. 65–98.

IEEE 802.9a Editor. Integrated service (is): IEEE 802.9a "Isochronous Services With CSMA/CD MAC Service", IEEE Draft, Mar. 1995.

ITU–T, "Visual Telephone Systems and Equipment For Local Area Networks Which Provide A Non–Guaranteed Quality Of Service", ITU–T Recommendation H.323, 1996.

ITU–T "Line Transmission Of Non–Telephone Signals: Control Protocol For Multimedia Communication", ITU–T Recommendation H.245, 1994.

Kandlur et al., "Real Time Communication In Multi–Hop Networks", *IEEE Transactions On Parallel and Distributed Systems*, vol. 5, No. 10, Oct. 1991, pp. 10441055.

M.G.H. Katevenis, "Fast Switching And Fair Control Of Congested Flow In Broadband Networks", *IEEE Journal on Selected Areas in Communications*, vol. SAC–5, No. 8, Oct. 1987, pp. 1315–1326.

J.Levine, "An Algorithm to Synchronize the Time of a Computer to Universal Time", *IEEE/ACM Transactions on Networking*, vol. 3, No. 1, Feb. 1995, pp 42–50.

Li et al., "Pseudo–Isochronous Cell Switching In ATM Networks", IEEE INFOCOM'94, pp. 428–437, 1994.

D.Mills, "Improved Algorithms for Synchronizing Computer Network Clocks", *Computer Comm. Rev. (USA)*, vol. 24, No. 4, Oct. 1994, pp 317–327.

D. Mills, "Internet Time Synchronization: The Network Time Protocol", *IEEE Transactions on Communications*, vol. 39, No. 10, Oct. 1981, pp. 1482–1493.

Y. Ofek, "The Topology, Algorithms And Analysis Of A Synchronous Optical Hypergraph Architecture", Ph.D. Dissertation, Electrical Engineering Department, University of Illinois at Urbana, Report No. UTUCDCS–R–87–1343, May 1987.

Y. Ofek, "Integration Of Voice Communications On A Synchronous Optical Hypergraph", INFOCOM'88, 1988.

Y. Ofek, "Generating A Fault Tolerant Global Clock Using High–Speed Control Signals For The MetaNet Architecture", *IEEE Transactions on Communications*, pp. 2179–2188, May 1994.

Y.Ofek, "The Conservation Code for Bit Synchronization", *IEEE Transactions on Communications*, vol. 38, No. 7, Jul. 1990, pp. 1107–1113.

Ofek et al., "[Time–Driven Priority] Flow Control For Real–Time Heterogeneous Internetworking", IEEE INFOCOM'96, 1996.

Parekh et al., "A Generalized Processor Sharing Approach To Flow Control In Integrated Services Networks: The Multiple Node Case", *IEEE Transactions on Networking*, vol. 2, No. 2, Apr. 1994, pp. 137–150.

Patterson et al., "Pipelining", *Computer Architecture: A Quantitative Approach*, Morgan Kaufman Publishers, San Mateo, CA, 1990, Chapter 6, pp. 251–278.

T. Piotrowski, "Synchronization Of Telecommunication Network Using A Global Positioning Satelite", Abstract, IEEE PLANS'92, Mar. 1992.

D. Robinson, "Internet Stratum One GPS Network Time Server: A Commercial Embodiment", Datum Corporation.

Rosen et al., "A Proposed Architecture For MPLS" <draft–ietf–mpls–arch–00.txt> INTERNET DRAFT, Aug. 1997.

Schultzrinne et. al, "RTP: A Transport Protocol for Real–Time Application, IETF Request for Comment RFC1889", Jan. 1996.

M. Schwartz, "Networking Layer: Routing Function", *Telecommunication Networks: Protocols, Modeling, and Analysis*, Addison Wesley, Reading MA, 1987, Chapter 6, pp. 259–330.

Shenker et al., "Specification of Guaranteed Quality of Service, IETF Request for Comment RFC2212", Sep. 1997.

W. Stallings, "Overview", *SNMP, SNMPy2, and CMIP: The Practical Guide To Network Management*, Addison Wesley, 1993, Chapter 1, pp. 1–14.

A.Tannebaum, "Routing Algorithms", *Computer Networks*, (3rd Ed) Prentice Hall, 1996, Chapter 5.2, pp. 345–374.

C. Topolcic (Ed.) Experimental Internet Stream Protocol, Version 2 (ST–II), RFC 1190, Oct. 1990.

J. Wroclawski, "Specification of the Controlled–Load Network Element Service", IETF RFC 2211, Sep. 1997.

D. Mills, "Network Time Protocol (Version 3) Specification, Implementation and Analysis", Network Working Group, RFC 1305, University of Delaware, Mar. 1992.

S.J.Golestani, "A Framing Strategy for Congestion Management", *IEEE Journal on Selected Areas in Communications*, vol. 9, No. 7, Sep. 1991, pp. 1064–1077.

Li et al., "Pseudo–isonchronous Cell Forwarding", *Computer Networks and ISDN Systems*, vol. 30 (1998), pp. 2359–2372.

Li et al., "[Time–driven Priority] Flow Control for Real–time Heterogeneous Internetworking", *Proceedings of Infocom.* vol. 15, Los Alamitos, CA, Mar. 1996, pp. 189–197.

* cited by examiner

FIG. 10

| | 4B/5B encoding scheme | |
|---|---|---|
| HEX DATA | 4-bit Binary Data | 5-bit Encoded Data Codeword |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

4B/5B encoding scheme

| HEX DATA | Control Input Binary Data | 10-bit Encoded Control Codeword | |
|---|---|---|---|
| 1 | 0001 | 11111 | 11111 |
| 2 | 0010 | 01101 | 01101 |
| 3 | 0011 | 01101 | 11001 |
| 4 | 0100 | 11111 | 00100 |
| 5 | 0101 | 01101 | 00111 |
| 6 | 0110 | 11001 | 00111 |
| 7 | 0111 | 11001 | 11001 |
| 8 | 1000 | 00100 | 00100 |
| 9 | 1001 | 00100 | 11111 |
| A | 1010 | 00100 | 00000 |
| B | 1011 | 00111 | 00111 |
| C | 1100 | 00111 | 11001 |
| D | 1101 | 00000 | 00100 |
| E | 1110 | 00000 | 11111 |
| F | 1111 | 00000 | 00000 |

FIG. 11

(A) Without a time-stamp (B) With a time-stamp

Given at:
(1) the source, or
(2) the PT sub-network boundary

- Real-time protocol (RTP) with the following fields in the header:
  - version (V) - 2 bits
  - padding (P) - 1 bit
  - extension (X) - 1 bit
  - CSRC count (CC) - 4 bits
  - marker (M) - 1 bit
  - payload type - 7 bits
  - sequence number - 16 bits
  - times-tamp - 32 bits

ASYNCHRONOUS PACKET SWITCHING WITH COMMON TIME REFERENCE

RELATED APPLICATIONS

This application is a continuation of provisional application Ser. No. 60/088,891 filed Jun. 11, 1998.

BACKGROUND OF THE INVENTION

This invention relates generally to a method and apparatus for transmitting of data on a communications network. More specifically, this invention relates to timely forwarding and delivery of data over the network and to their destination nodes. Consequently, the end-to-end performance parameters, such as, loss, delay and jitter, have either deterministic or probablistic guarantees.

The proliferation of high-speed communications links, fast processors, and affordable, multimedia-ready personal computers brings about the need for wide area networks that can carry real time data, like telephony and video. However, the end-to-end transport requirements of real-time multimedia applications present a major challenge that cannot be solved satisfactorily by current networking technologies. Such applications as video teleconferencing, and audio and video multicasting generate data at a wide range of bit rates and require predictable, stable performance and strict limits on loss rates, average delay, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [Ballart et al., "SONET: Now It's The Standard Optical Network", IEEE Communications Magazine, Vol. 29 No. 3, March 1989, pages 8–15] [M. Schwartz, "Telecommunication Networks: Protocols, Modeling, and Analysis", Addison Wesley, Reading Mass., 1987].

Packet switching networks like IP (Internet Protocol)-based Internet and Intranets [see, for example, A. Tannebaum, "Computer Networks" (3rd Ed) Prentice Hall, 1996] and ATM (Asynchronous Transfer Mode) [see, for example, Handel et al., "ATM Networks: Concepts, Protocols, and Applications", (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception. In fact, under best effort service, the performance characteristics of a given connection are not even predictable at the time of connection establishment.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR). For IP, the defined services include guaranteed performance (bit rate, delay), controlled flow, and best effort [J. Wroclawski, "Specification of the Controlled-Load Network Element Service", IETF RFC 2211, September 1997] [Shenker et. al., "Specification of Guaranteed Quality of Service", IETF RFC 2212. September 1997]. Signaling protocols, e.g., RSVP and UNI3.1, which carry control information to facilitate the establishment of the desired services, are specified for IP and ATM, respectively [R. Braden, "Resource ReSerVation Protocol (RSVP)—Version 1 Functional Specification, IETF Request for Comment RFC2205", September 1997] [Handel et al., "ATM Networks: Concepts, Protocols, and Applications", (2nd Ed.) Addison-Wesley, 1994]. These protocols address the transport of data to one destination known as unicast or multiple destinations multicast [S. Deering, "Multicast Routing In Datagram Internet", Ph.D. Thesis, Stanford University, December 1991]. In addition, SIP, a higher level protocol for facilitating the establishment of sessions that use the underlying services, is currently under definition under IETF auspices [Handley et al., "SIP-Session Initiation Protocol", <draft-draft-ietf-mmusic-sip-04.ps>, November 1997].

The methods for providing different services under packet switching fall under the general title of Quality of Service (QoS). Prior art in QoS can be divided into two parts: (1) traffic shaping with local timing without deadline scheduling, for example [M. G. H. Katevenis, "Fast Switching And Fair Control Of Congested Flow In Broadband Networks", IEEE Journal on Selected Areas in Communications, SAC-5(8):1315–1326, October 1987; Demers et al., "Analysis and Simulation Of A Fair Queuing Algorithm", ACM Computer Communication Review (SIGCOMM'89), pages 3–12, 1989; S. J. Golestani, "Congestion-Free Communication In High-Speed Packet Networks", IEEE Transcripts on Communications, COM-39(12):1802–1812, December 1991; Parekh et al., "A Generalized Processor Sharing Approach To Flow Control—The Multiple Node Case", IEEE/ACM T. on Networking, 2(2): 137–150, 1994], and (2) traffic shaping with deadline scheduling, for example [Ferrari et al., "A Scheme For Real-Time Channel Establishment In Wide-Area Networks", IEEE Journal on Selected Areas in Communication, SAC8(4):368–379, April 1990; Kandlur et al., "Real Time Communication In Multi-Hop Networks", IEEE Trans. on Parallel and Distributed Systems, Vol. 5, No. 10, pp. 1044–1056, 1994]. Both of these approaches rely on manipulation of local queues by each router with little coordination with other routers. The Weighted Fair Queuing (WFQ), which typifies these approaches, is based on cyclical servicing of the output port queues where the service level of a specific class of packets is determined by the amount of time its queue is served each cycle [Demers et al., "Analysis and Simulation Of A Fair Queuing Algorithm", ACM Computer Communication Review (SIGCOMM'89), pages 3–12, 1989]. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The recognition that the processing of packets by switches and routers constitutes a performance bottleneck resulted in the development of methods for enhancing performance by simplifying the processing of packets. Multiprotocol Label Switching (MPLS) converts the destination address in the packet header into a short tag, which defines the routing of the packet inside the network [Callon et al., "A Proposed Architecture For MPLS" <draft-ietf-mpls-arch-00.txt>INTERNET DRAFT, August 1997].

The real-time transport protocol (RTP) [H. Schultzrinne et. al, RTP: A Transport Protocol for Real-Time Applications, IETF Request for Comment RFC1889, January 1996] is a method for encapsulating time-sensitive data packets and attaching to the data time related information like time stamps and packet sequence number. RTP is currently the accepted method for transporting real time streams over IP internetworks and packet audio-video telephony based on ITU-TH.323.

Synchronous methods are found mostly in circuit switching, as compared to packet switching that uses mostly asynchronous methods. However, some packet switching synchronous methods have been proposed. IsoEthernet or IEEE 802.9a [IEEE 802.9a Editor. Integrated service (is): IEEE 802.9a "Isochronous Services With CSMA/CD MAC Service", IEEE Draft, March 1995] combines CSMA/CD (IEEE 802.3), which is an asynchronous packet switching, with N-ISDN and H.320, which is circuit switching, over existing Ethernet infrastructure (10Base-T). This is a hybrid solution with two distinct switching methods: N-ISDN circuit switching and Ethernet packet switching. The two methods are separated in the time domain by time division multiplexing (TDM). The IsoEthernet TDM uses fixed allocation of bandwidth for the two methods—regardless of their utilization levels. This approach to resource partitioning results in undesirable side effect like under-utilization of the circuit switching part while the asynchronous packet switching is over loaded but cannot use the idle resources in the circuit switching part.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87-1343, May 1987], which also relates to how to integrate packet telephony using synchronization [Y. Ofek, "Integration Of Voice Communication On A Synchronous Optical Hypergraph", INFOCOM'88, 1988]. In the synchronous optical hypergraph, the forwarding is performed over hyper-edges, which are passive optical stars. In [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to-point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine [Patterson et al., "Computer Architecture: A Quantitative Approach", Morgan Kaufman Publishers, San Francisco, 1990]. In U.S. Pat. No 5,455,701, Eng et al. discloses an apparatus for controlling a high-speed optical switching system with pipeline controller for switch control. In U.S. Pat. No. 5,418,779 Yemini et al. disclose a switched network architecture with common time reference. The time reference is used in order to determine the time in which multiplicity of nodes can transmit simultaneously over one predefined routing tree to one destination. At every time instance the multiplicity of nodes are transmitting to different single destination node.

SUMMARY OF THE INVENTION

In accordance with the present invention, a method is disclosed providing virtual pipes that carry real-time traffic over packet switching networks while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections. On the Internet the non-reserved data packet traffic is called "best effort" traffic. In accordance with the present invention, the bandwidth allocated to a connection and the delay and jitter inside the network are independent. MPLS can be used by the present invention to identify virtual pipes. The packet time-stamp that is carried in the RTP header can be used in accordance with the present invention to facilitate time-based transport.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: http://www.utexas.edu/depts/grg/gcraft/notes/gps/gps.html). By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http:\\www.boulder.nist.gov/timefreq) is responsible for coordinating with the International Bureau of Weights and Measures (BIPM) in Paris in maintaining UTC.

UTC timing is readily available to individual PCs through GPS cards. For example, TrueTime, Inc.'s (Santa Rosa, Calif.) PCI-SG provides precise time, with zero latency, to computers that have PCI extension slots. Another way by which UTC can be provided over a network is by using the Network Time Protocol (NTP) [D. Mills, "Network Time Protocol" (version 3) IETF RFC 1305]. However, the clock accuracy of NTP is not adequate for interswitch coordination, on which this invention is based.

In accordance with the present invention, the use of reserved resources is allowed by all packet traffic whenever the reserved resources are not in use.

A key difference between the synchronous optical hypergraph and the present invention is the forwarding of packets over simple point-to-point edges in this invention. The pipeline in accordance with the present invention is used for the forwarding of packets inside the network, not for switch control as in the Eng et al. patent Although the present invention relies on time to control the flow of packets inside the network in a similar fashion as in circuit switching, there are major differences between the two approaches. In circuit switching, for each data unit (e.g., a byte) at the time it has been transmitted from its source, it is possible to predict deterministically the future times it will be transmitted from any switch along its route [Ballart et al., "SONET: Now It's The Standard Optical Network", IEEE Communications Magazine, Vol. 29 No. 3, March 1989, pages 8–15]. The time resolution of this advanced knowledge is much shorter than the data unit transmission time. On the other hand, in accordance with the present invention, for each data unit (e.g., a cell) at the time it has been transmitted from its source, it is possible to know the future time frames that this data unit will be forwarded along its route. However, the time frame, which constitutes the accuracy of this advance timing knowledge, is much larger than one data unit transmission time. For example, the transmission time of an ATM cell (53 bytes) over a gigabit per second link is 424 nanoseconds, which is 294 times smaller than a typical time frame of 125 microseconds—used in one embodiment of the present invention. There are several consequences that further distinguish the present invention from circuit switching:

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or a tag/label.

In accordance with the present invention, the Internet "best effort" packet forwarding strategy can be integrated into the system.

These and other aspects and attributes of the present invention will be discussed with reference to the following drawings and accompanying specification.

BRIEF DESCRIPTION OF THE DRAWINGS

FIG. 10 is a table of the 4B/5B encoding scheme for data such as is used by the AM7968—TAXI chip set in accordance with one embodiment of the present invention;

FIG. 11 is a table of the 4B/5B encoding scheme for control signals, such as, the time frame delimiter (TFD) such as is used by the AM7968, in accordance with one embodiment of the present invention;

FIGS. 15A and 15B illustrate two generic data packet headers with virtual pipe ID (PID), and priority bit (P), wherein FIG. 15A illustrates a packet without time-stamp field, and wherein FIG. 15B illustrates a packet with time-stamp field, and also shows how the common time-reference value, time of arrival (TOA), is attached by the routing controller;

DETAILED DESCRIPTION OF THE ILLUSTRATED EMBODIMENTS

Figure 1:
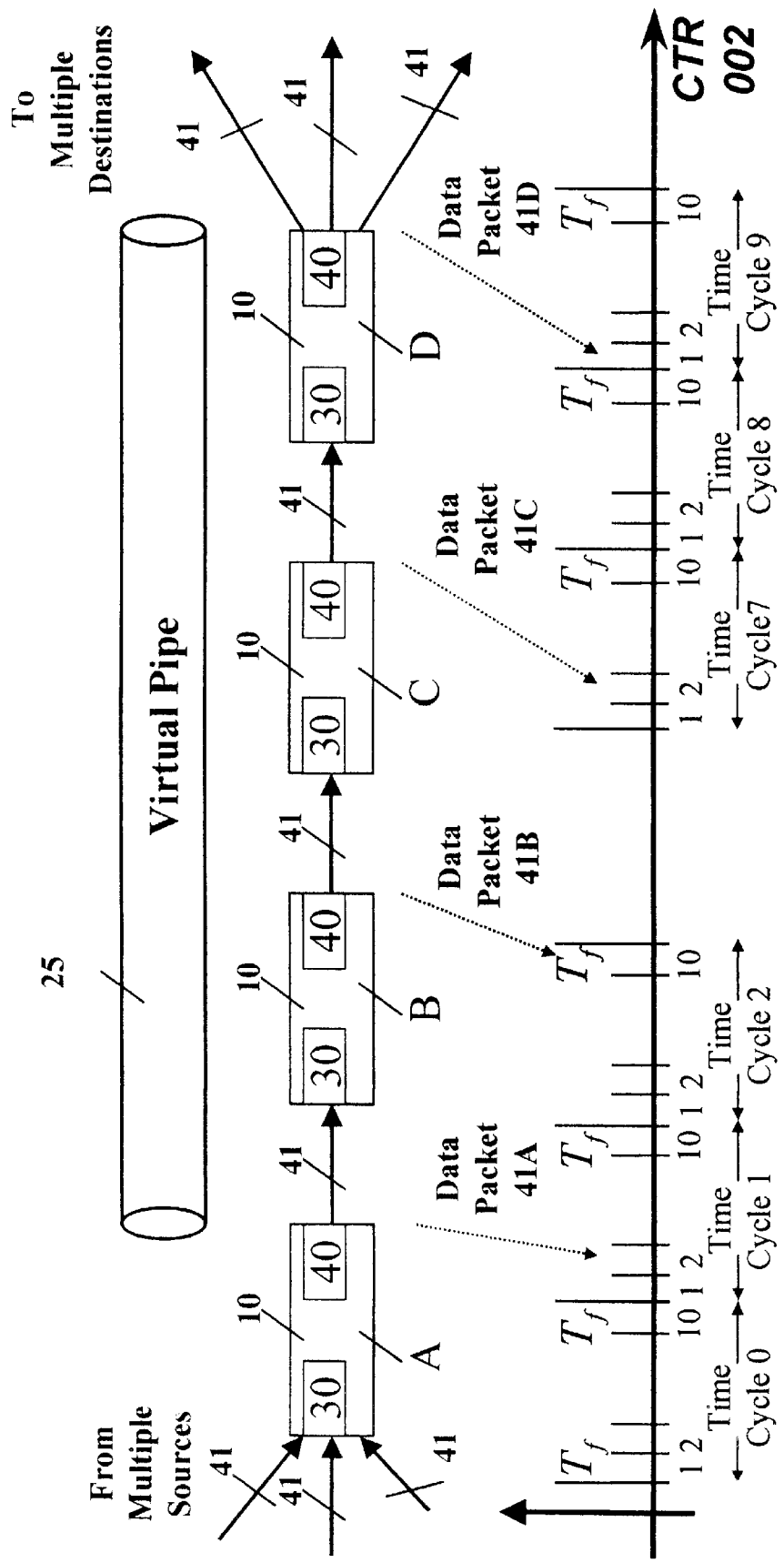
FIG. 1 is a schematic illustration of a virtual pipe and its timing relationship with a common time reference (CTR), wherein delay is determined by the number of time frames between the forward time out at Node A and the forward time out at Node D.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for transmitting and forwarding packets over a packet switching network. The switches of the network maintain a common time reference, which is obtained either from an external source (such as GPS—Global Positioning System) or is generated and distributed internally. The time intervals are arranged in simple periodicity and complex periodicity (like seconds and minutes of a clock). A packet that arrives to an input port of a switch, is switched to an output port based on specific routing information in the packet's header (e.g., IPv4 destination address in the Internet, VCI/VPI labels in ATM). Each switch along a route from a source to a destination forwards packets in periodic time intervals that are predefined using the common time reference. The time interval duration can be longer than the time duration required for transmitting a packet, in which case the exact position of a packet in the time interval is not predetermined.

Packets that are forwarded inside the network over the same route and in the same periodic time intervals constitute a virtual pipe and share the same pipe-ID. Pipe-ID can be either explicit, such as a tag or a label that is generated inside the network, or implicit such as a group of IP addresses. A virtual pipe can be used to transport data packets from multiple sources and to multiple destinations. A virtual pipe provides deterministic quality of service guarantees. The time interval in which a switch forwards a specific packet is determined by the packet's pipe-ID, the time it reaches the switch, and the current value of the common time reference. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same pipe ID and the links and time intervals on which they are forwarded comprise a virtual tree. This facilitates congestion-free forwarding from one input port to multiple output ports, and consequently, from one source to multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. For each switch, there is a first predefined time frame within which a respective data packet is transferred into the respective switch, and a second predefined time frame within which the respective data packet is forwarded out of the respective switch. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

There is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

There is a constant fixed time between the input into and output from a respective one of the switches for each of the time frames within each of the time cycles. A fixed number of contiguous time cycles comprise a super cycle, which is periodic. Data packets that are forwarded over a given virtual pipe are forwarded from an output port within a predefined subset of time frames in each super cycle. Furthermore, the number of data packets that can be forwarded in each of the predefined subset of time frames within a super cycle for a given virtual pipe is also predefined.

In the preferred embodiment the common time reference signal is coupled from a GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the super cycle duration is equal to one second as measured using the UTC (Coordinated Universal Time) standard. The super cycle can also be equal to multiple UTC seconds or a fraction of a UTC second.

A select buffer controller maps one of the time frames for output from a first switch to a second time frame for input via the communications link to a second switch. The select buffer controller uses the UTC time signal in order to identify the boundaries between two successive time frames. The select buffer controller inserts a time frame delimiter (TFD) signal into the transmission link in order to the signal the second switch with the exact boundary between two time frames.

Each of the data packets is encoded as a stream of data, and a time frame delimiter is inserted into the stream of data responsive to the select buffer controller. This can be implemented by using a redundant serial codewords as it is later explained.

The communication links can be of fiber optic, copper, and wireless communication links for example, between a ground station and a satellite, and between two satellites orbiting the earth. The communication link between two nodes does not have to be a serial communication link. A parallel communication link can be used—such link can simultaneously carry multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines two possible associations of an incoming data packet: (i) the output port, and (ii) the time of arrival (TOA). The TOA is then used by the scheduling controller for determining when a data packet should be forwarded by the select buffer controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a packet was created by its application.

In one embodiment the time-stamp is generated by an Internet real-time protocol (RTP), and by a predefined one of the switches. The time-stamp can be used by a scheduling controller in order to determine the forwarding time of a data packet from an output port.

Each of the data packets originates from an end station, and the time-stamp is generated at the respective end station for inclusion in the respective originated data packet. Such generation of a time-stamp can be derived from UTC either by receiving it directly from GPS or by using the Internet's Network Time Protocol (NTP).

The following description illustrates a preferred embodiment and implementation of the system disclosed in accordance with the present invention. In FIGS. 1–8, the principles of operation and implementation are presented and discussed. In FIGS. 9–23, the details of one embodiment's design are given.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

Figure 2:
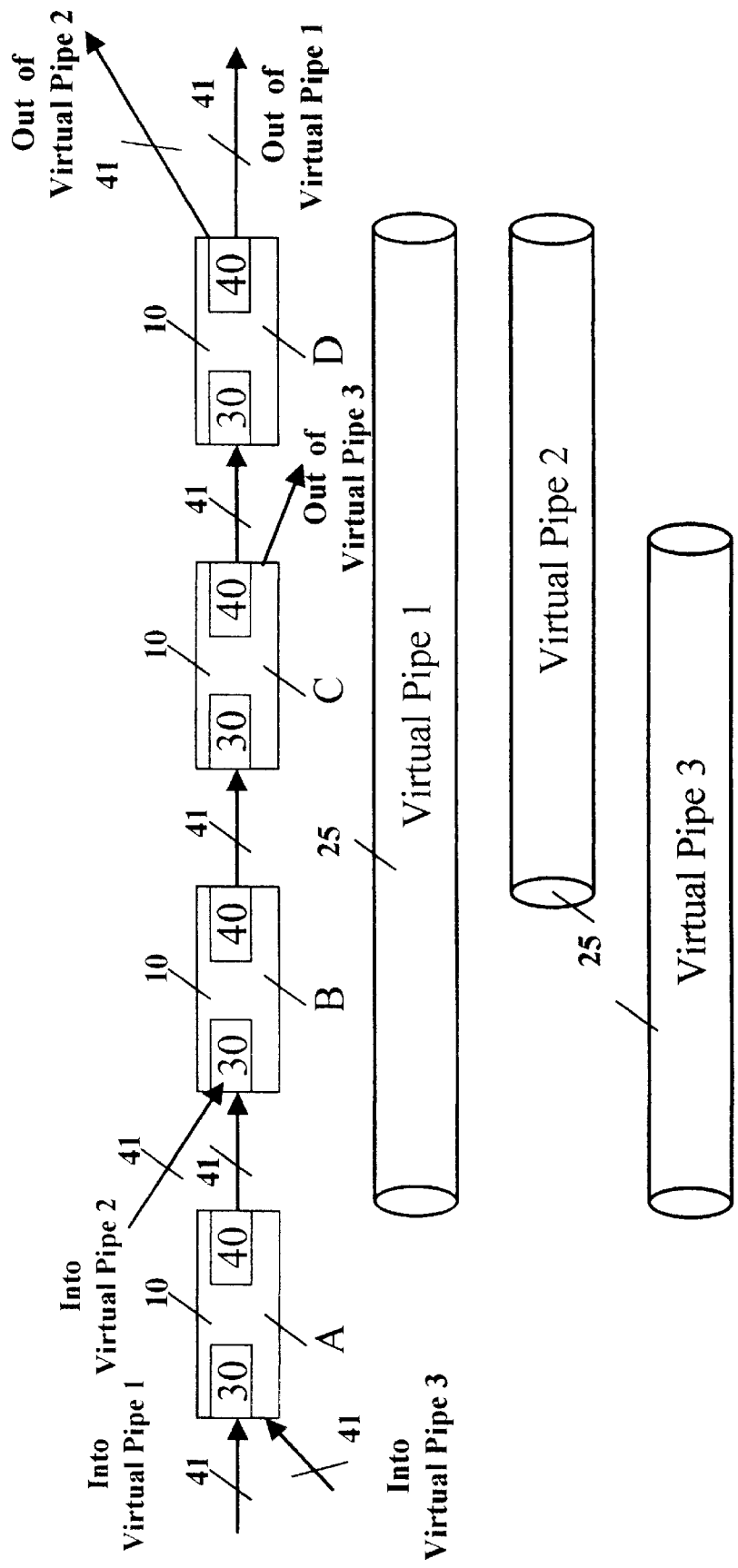
FIG. 2 is a schematic illustration of multiple virtual pipes sharing certain ones of the switches.

In accordance with the design, method, and illustrated implementation of the present invention, one or a plurality of virtual pipes 25 are provided, as shown in FIG. 1 and FIG. 2, over a data network with general topology. Such data network can span the globe. Each virtual pipe 25 is constructed over one or more switches 10, shown in FIG. 1, which are interconnected via communication links 41 in a path.

FIG. 1 illustrates a virtual pipe 25 from the output port 40 of switch A, through switches B and C. This virtual pipe ends at the output port 40 of node D. The virtual pipe 25 transfers data packets from at least one source to at least one destination.

FIG. 2 illustrates three virtual pipes: virtual pipe 1 from the output of switch A to the output of switch D, virtual pipe 2 from the output of switch B to the output of switch D, and virtual pipe 3 from the output of switch A to the output of switch C.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference 002 (CTR) signal to each of the switches 10.

Figure 3:
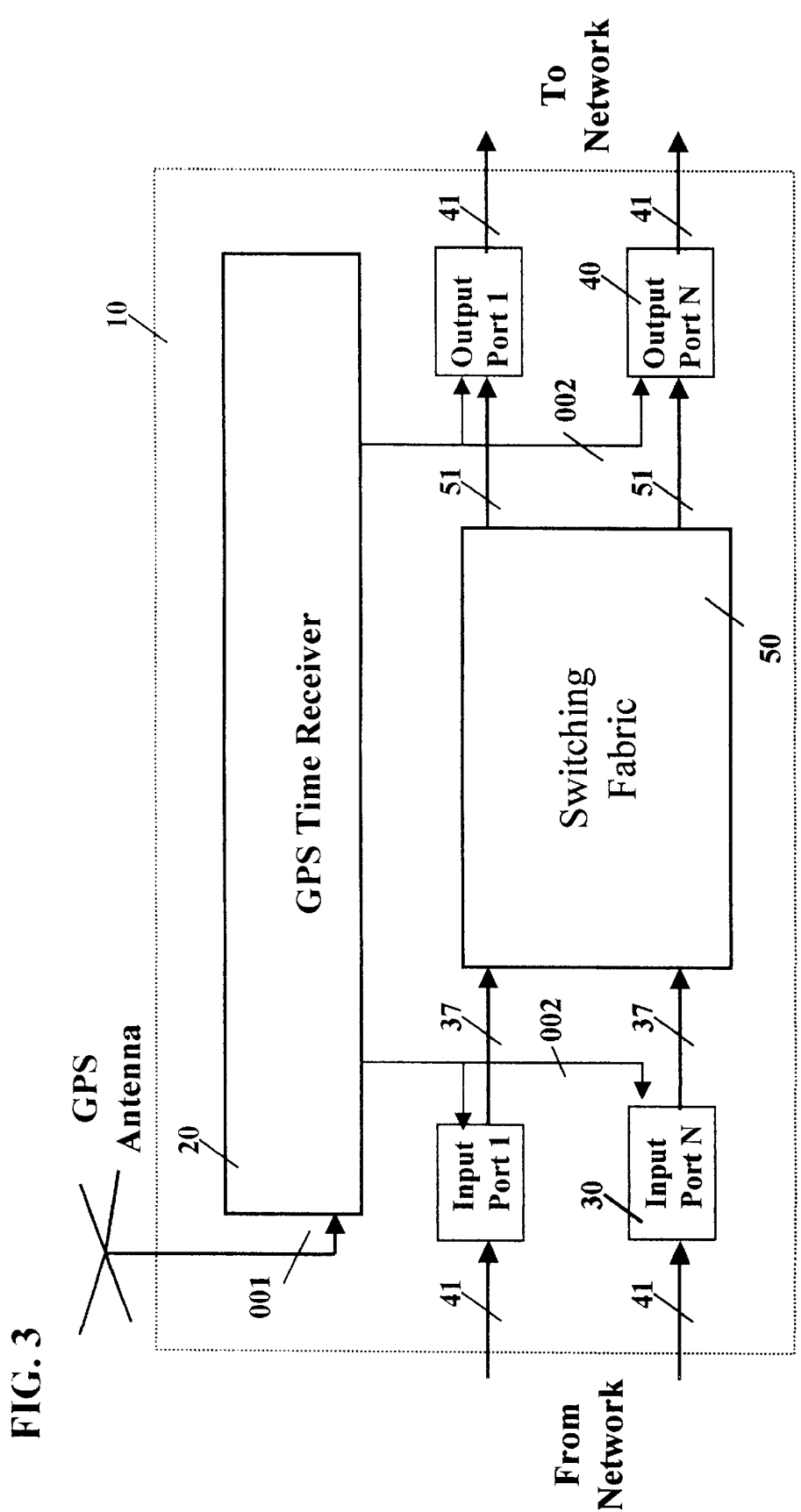
FIG. 3 is a schematic block diagram illustration of a switch that uses a common time reference from the GPS (Global Positioning System) for the timely forwarding of packets disclosed in accordance with the present invention.

FIG. 3 illustrates the structure of a pipeline switch 10. The switch 10 is comprised of one or a plurality of input ports 30, one or a plurality of output ports 40, switching fabric 50, and global positioning system (GPS) time receiver 20 with a GPS antenna 001. The GPS time receiver provides a common time reference signal (CTR) 002 to all input and output ports.

The Common Time Reference (CTR) 002

Figure 4:
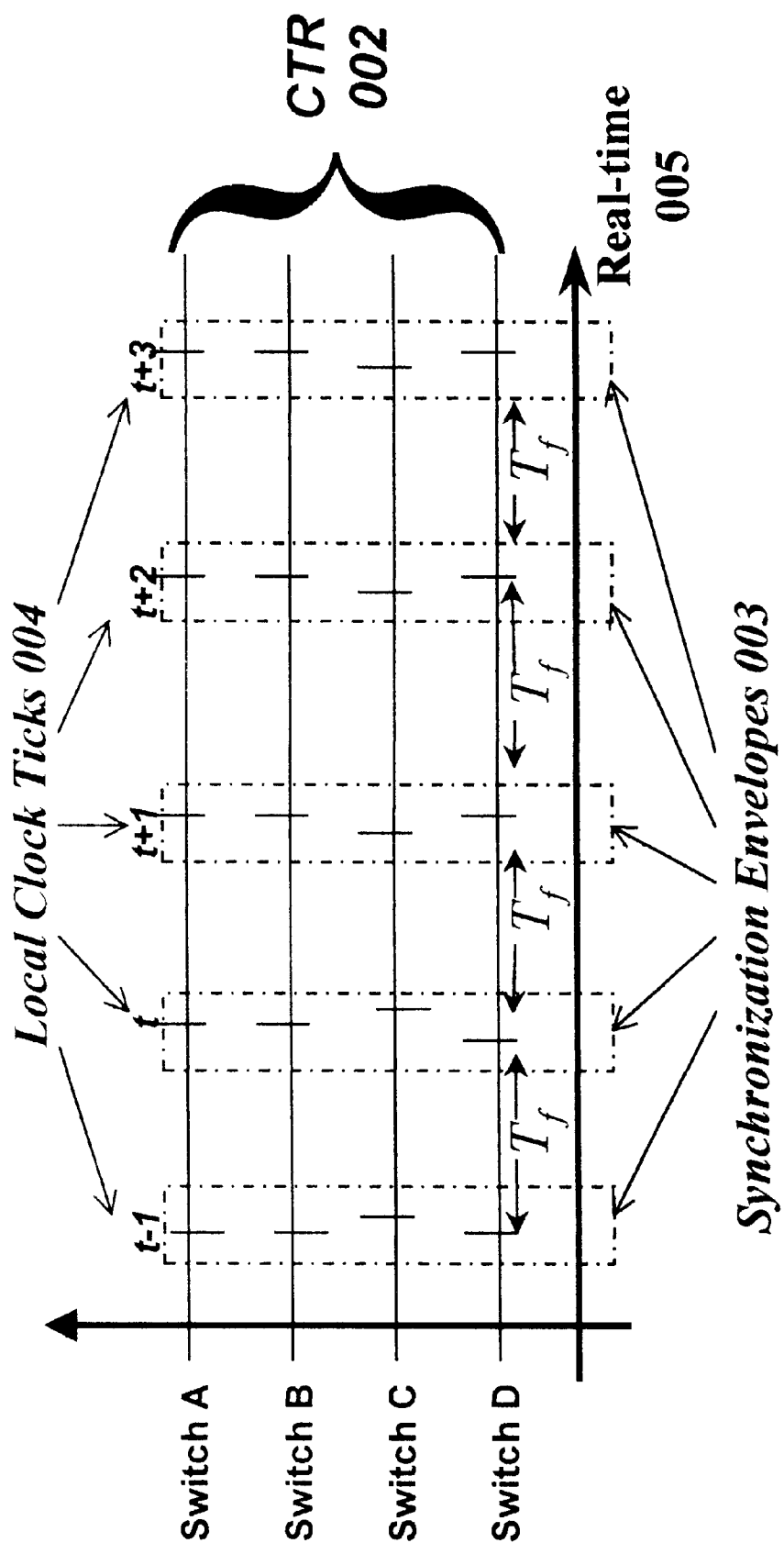
FIG. 4 illustrates the relationship among the local common time reference (CTR) on the switches, and how the multiplicity of local times is projected on the real-time axis, wherein time is divided into time frames of a predefined duration.

As shown in FIG. 4, the common time reference 002 that is coupled to the switches 10 provides the following property: the local clock ticks 004, shown in FIG. 4, at all the pipeline switches (e.g., switches A, B, C, and D in FIGS. 1 and 2) when projected on the real-time axis 005 will all occur within predefined synchronization envelopes 003. In other words, the local clock ticks 004 occur within the synchronization envelopes 003, and therefore, outside relative to the synchronization envelopes all local clocks have the same clock value.

The common time reference is divided in a predefined manner into time frames, Tf, of equal duration, as shown in FIG. 4, typically Tf=125 microseconds. The time frames are grouped into time cycles. Each time cycle has predefined number of time frames.

Figure 5:
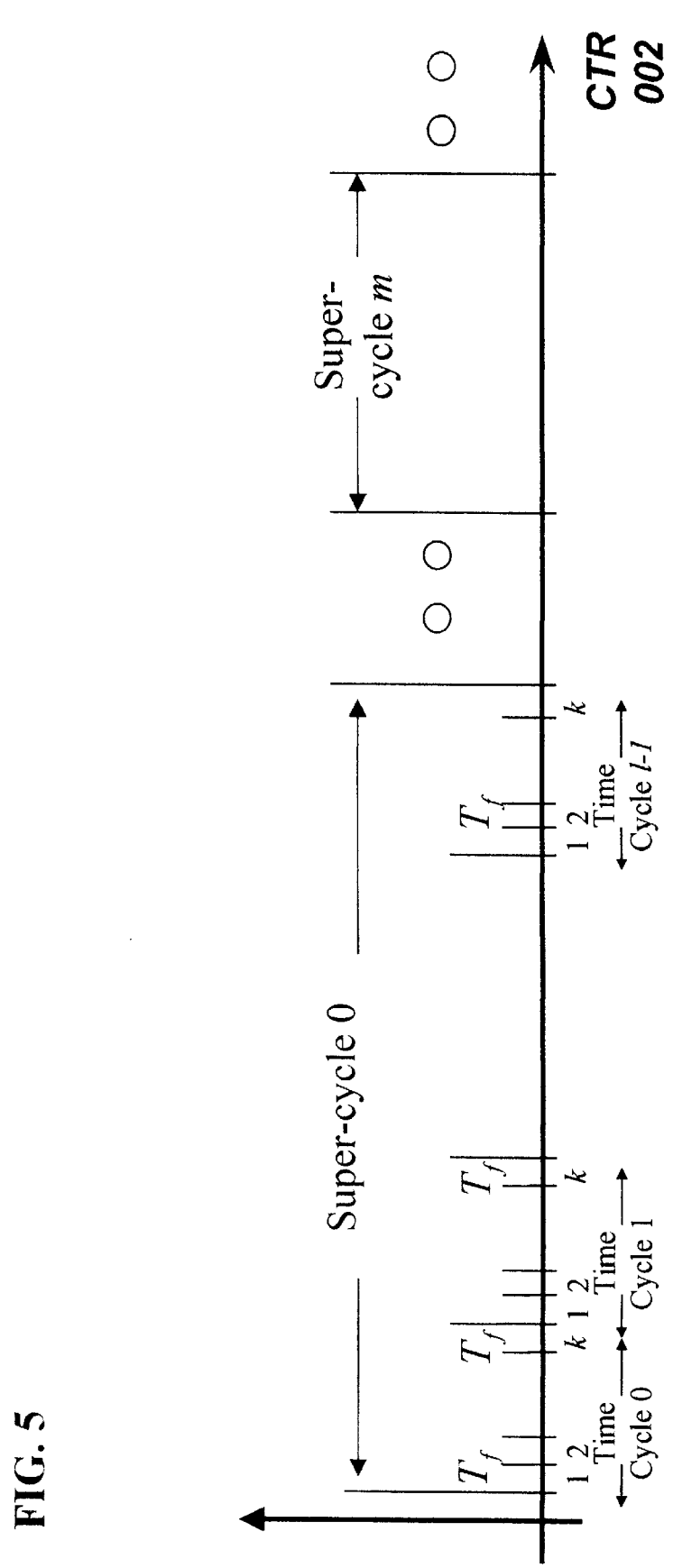
FIG. 5 is a schematic illustration of how the common time reference is organized into contiguous time-cycles of k time-frames each and contiguous super-cycle of 1 time-cycles each.

Referring to FIG. 5, there are k time frames in each time cycle. Contiguous time cycles are grouped together into contiguous super cycles, and as shown in FIG. 5, there are l time cycles in each super cycle.

Figure 6:
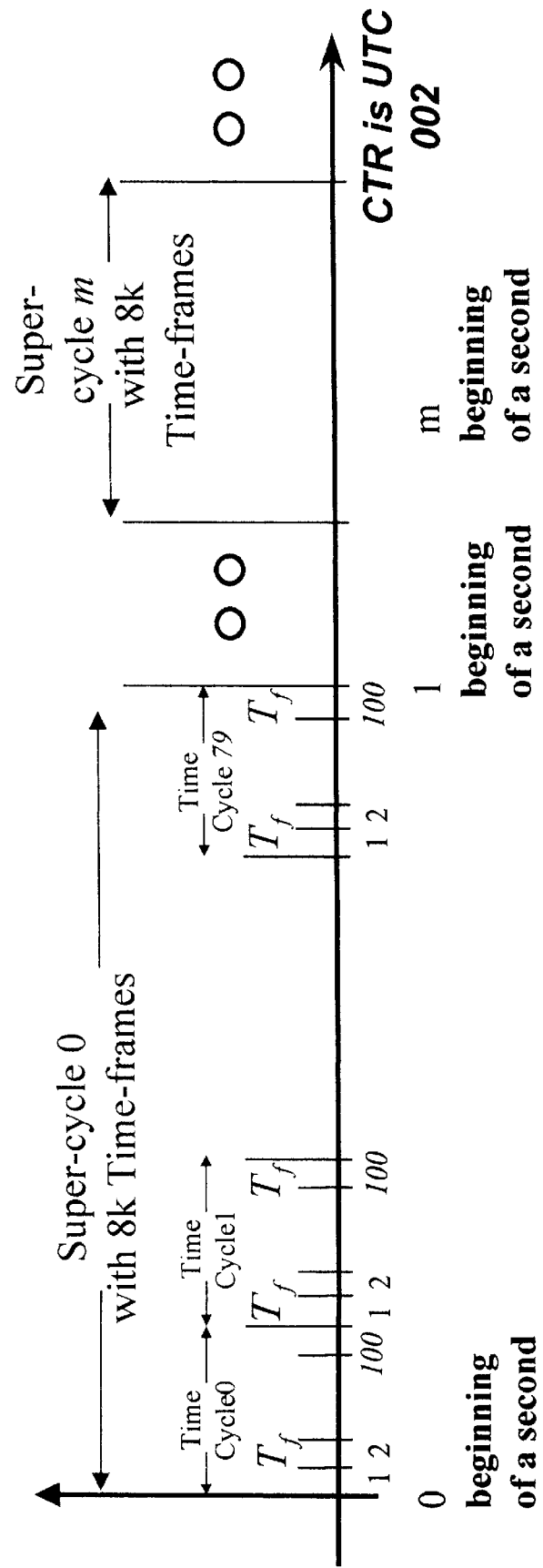
FIG. 6 is a schematic illustration of the relationship of the network common time reference and UTC (Coordinated Universal Time), such that, each time-cycle has 100 time-frames, of 125 microseconds each, and 80 time-cycles are grouped into one super-cycle of one second.

FIG. 6 illustrates how the common time reference can be aligned with the UTC (Coordinated Universal Time) standard. In this illustrated example, every duration of every super cycle is exactly one second as measured by UTC. Moreover, the beginning of each super cycle coincides with the beginning of a UTC second, as shown in FIG. 6. Consequently, when leap seconds are inserted or deleted for UTC corrections (due to changes in the earth rotation period) the cycle and super cycle periodic scheduling will not be affected.

The time frames, time cycles, and super cycles are associated in the same manner with all respective switches within the virtual pipe at all times.

Pipeline Forwarding

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and are forwarded to one or more destinations.

Figure 7:
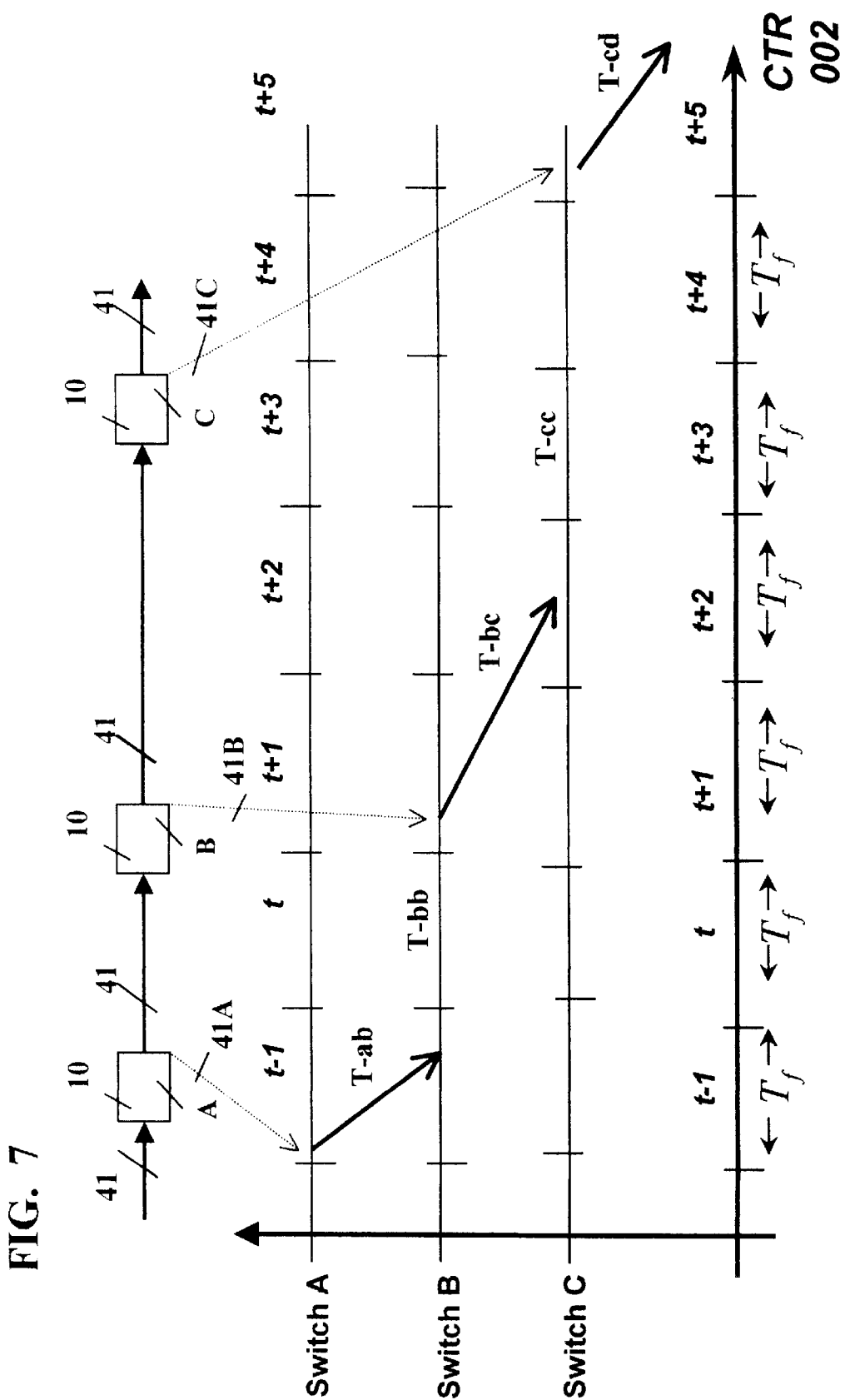
FIG. 7 is a schematic illustration of a data packet pipeline as in FIG. 1, and correlating to data packet movement through the switches 10 versus time for forwarding over a virtual pipe with common time reference (CTR)

This sort of pipeline forwarding used in accordance with the present invention is illustrated in FIG. 7. Data packet 41A is forwarded out of switch A during time frame t−1. This data packet 41A will reach switch B after a delay of T−ab . This data packet 41A will be forwarded out of switch B as data packet 41B during time frame t+1 and will reach switch C after a delay of T−bc. This data packet 41B will be forwarded out of switch C as data packet 41C during time frame t+5. Data packet 41C will reach switch D after a delay of T−cd. Consequently, the delay from the output of switch A to the output of switch C is 6=t+5−(t−1) time frames. As illustrated in FIG. 7, all data packets that are forwarded over that virtual pipe will have a delay of six time frames from the output of switch A to the output of switch C.

Referring again to FIG. 1, the timely pipeline forwarding of data packets over the virtual pipe 25 is illustrated. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 1,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes.

In FIG. 2, where there are three virtual pipes:

The three virtual pipes can multiplex (i.e., mix their traffic) over the same communication links.

The three virtual pipes can multiplex (i.e., mix their traffic) during the same time frames and in an arbitrary manner.

The same time frame can be used by multiple data packets from one or more virtual pipes.

Virtual Pipe Capacity Assignment

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super cycles.

Figure 8:
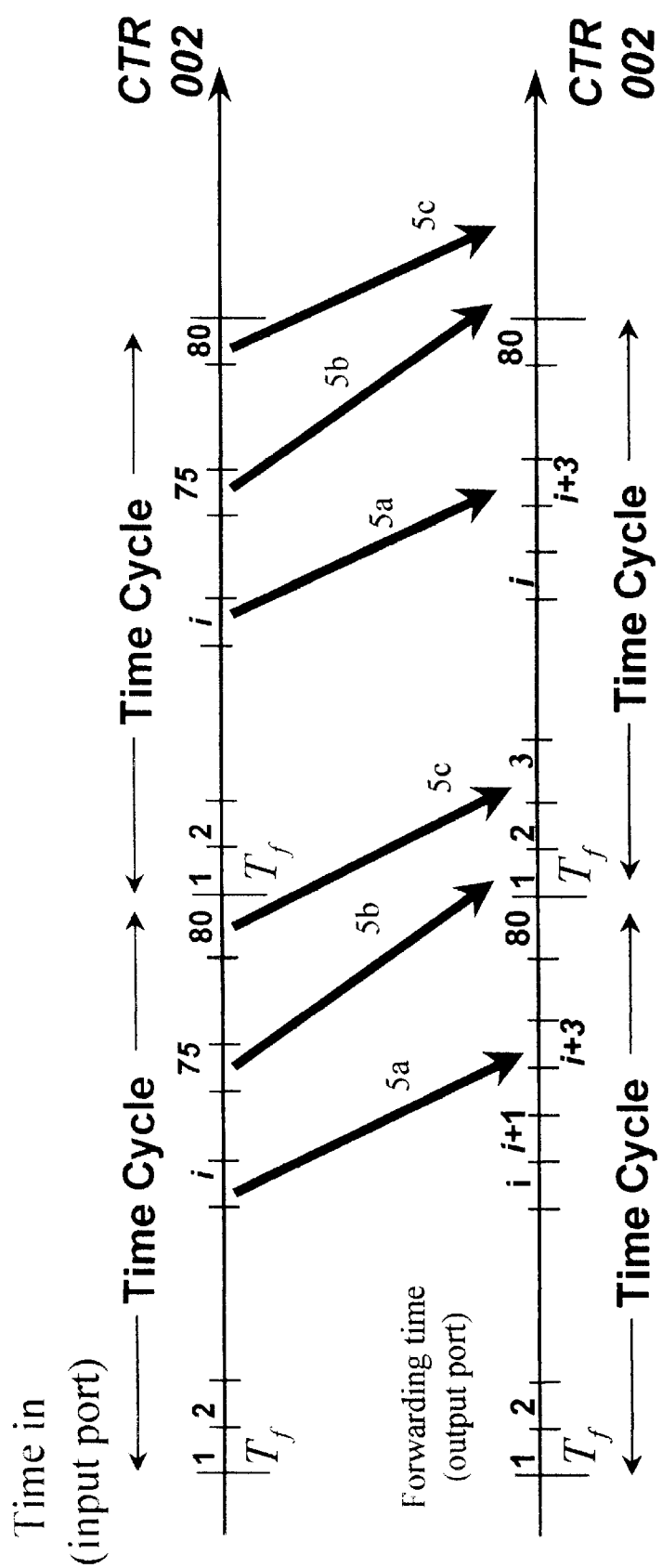
FIG. 8 illustrates the mapping of the time frames into and out of a node on a virtual pipe, wherein the mapping repeats itself in every time cycle illustrating time in versus forwarding time out.

FIG. 8 illustrates the timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch. If each of the three data packets has 125 bytes or 1000 bits, and there are 80 time frames of 125 microseconds in each time cycle (i.e., time cycle duration of 10 msec), then the bandwidth allocated to this virtual pipe is 300,000 bits per second.

In general, the bandwidth or capacity allocated for a virtual pipe is computed by dividing the number of bits transferred during each of the time cycles by the time cycle duration. In the case of a super cycle, the bandwidth allocated to a virtual pipe is computed by dividing the number of bits transferred during each of the super cycles by the super cycle duration.

The switch 10 structure, as shown in FIG. 3, can also be referred to as a pipeline switch, since it enables a network comprised of such switches to operate as a large distributed pipeline architecture, as it is commonly found inside digital systems and computer architectures.

Figure 9:
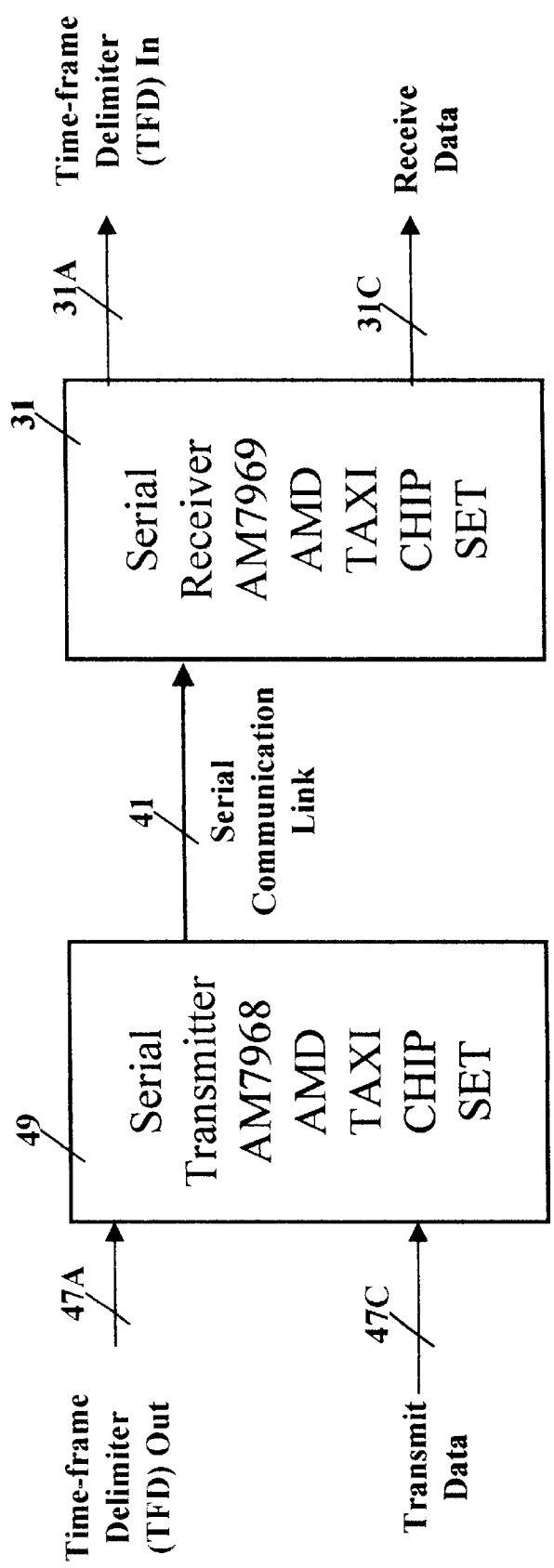
FIG. 9 is an illustration of a serial transmitter and a serial receiver.
Figure 12:
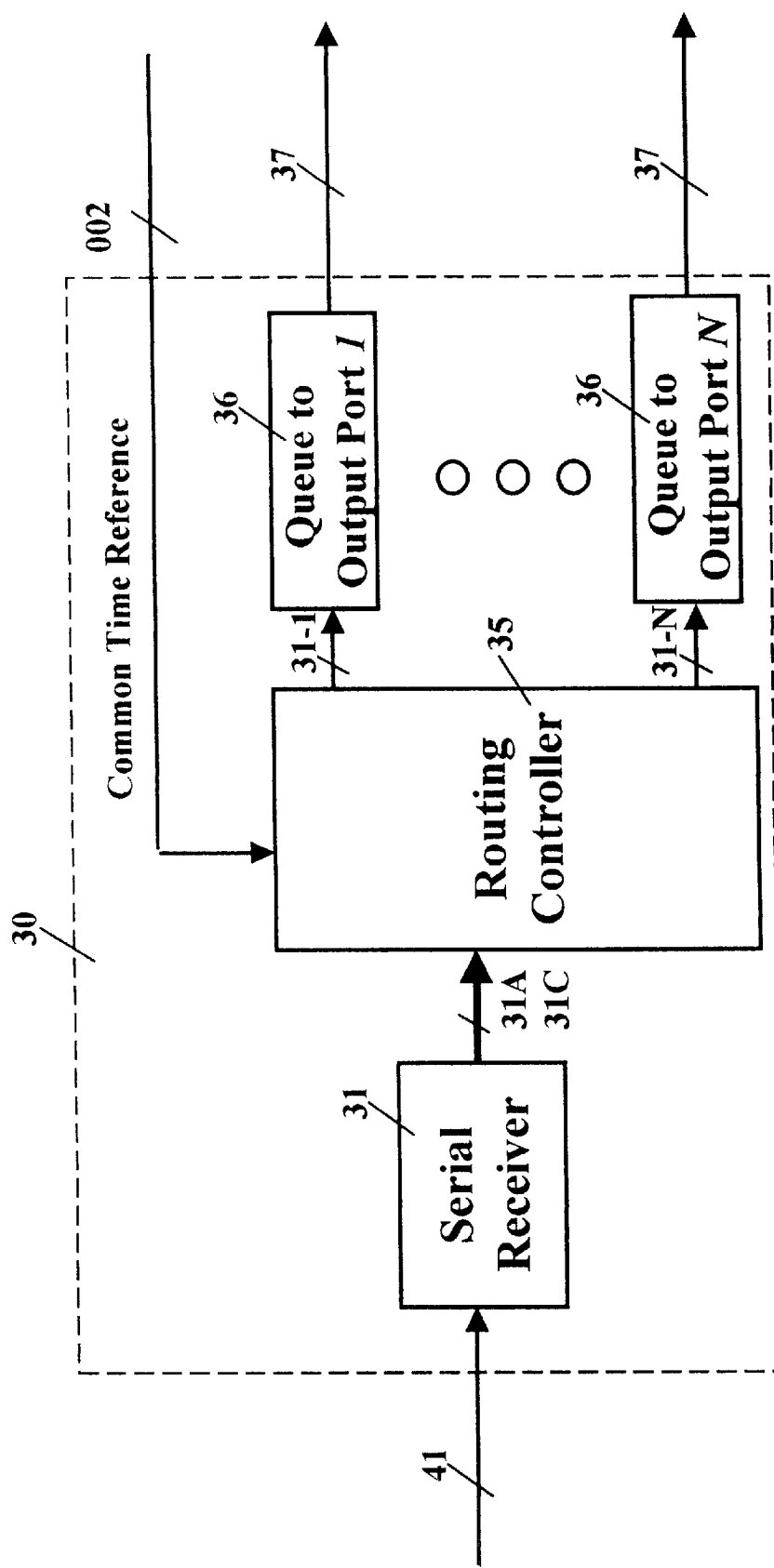
FIG. 12 is a schematic block diagram of an input port with a routing controller.
Figure 16:
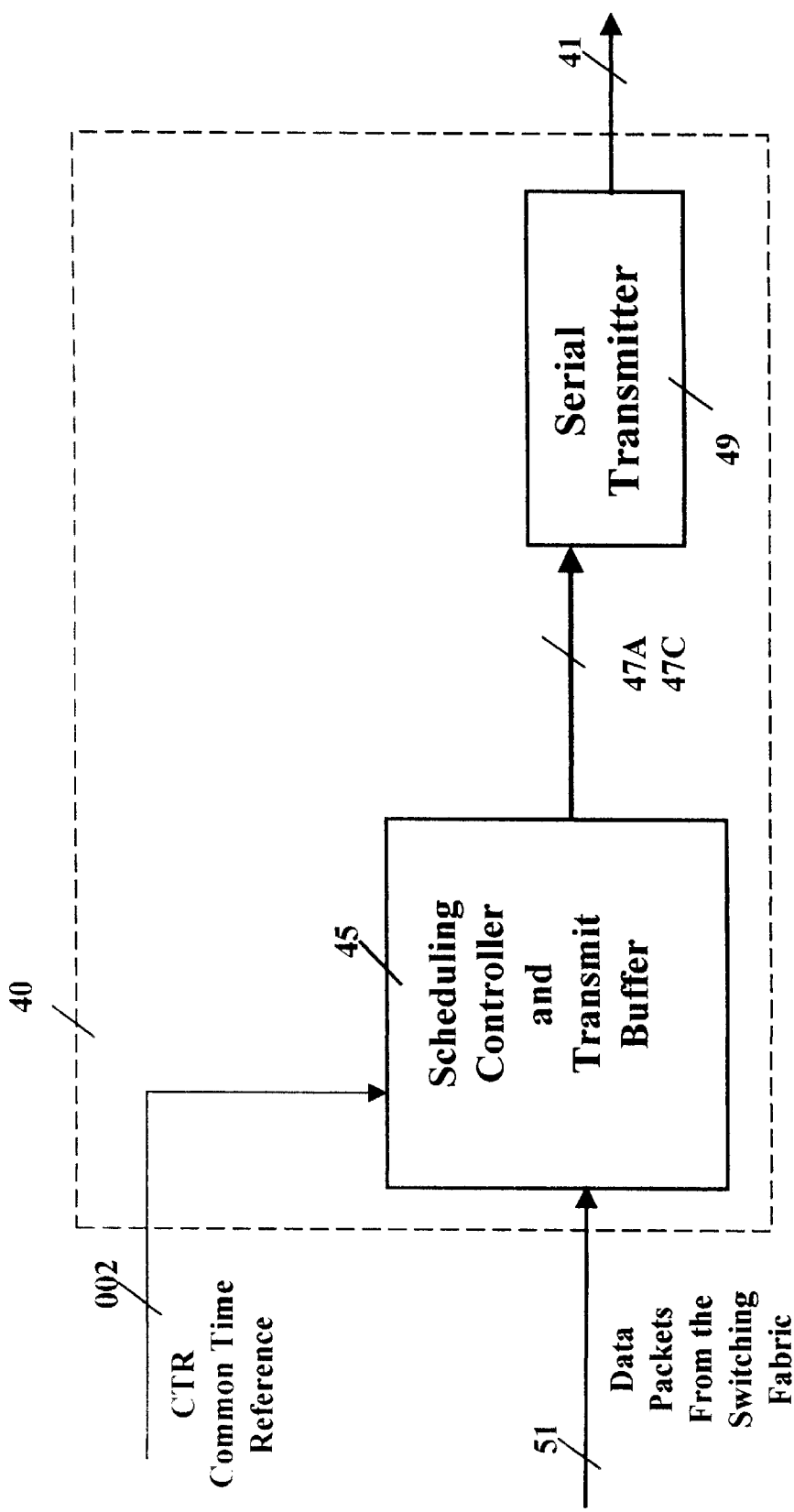
FIG. 16 is a schematic block diagram of an output port with a scheduling controller and a serial transmitter.

Each pipeline switch 10 is comprised of a plurality of addressable input ports 30 and output ports 40. As illustrated in FIG. 12, the input port 30 is further comprised of a routing controller 35 for mapping each of the data packets that arrives at each one of the input ports to a respective one of the output ports. As illustrated in FIG. 16, the output port 40 is further comprised of a scheduling controller and transmit buffer 45. An output port 40 is connected to an input port 30 via a communication link 41, as shown in FIG. 9. The communication link can be realized using various technologies compatible with the present invention.

As shown in FIG. 3, the common time reference 002 is provided to the input ports and output ports 40 from the GPS time receiver 20, which receives its timing signal from the GPS antenna 001. GPS time receivers are available from variety of manufacturers, such as, TrueTime, Inc. (Santa Rosa, Calif.) With such equipment it is possible to maintain a local clock with accuracy of ±1 microsecond from the UTC (Coordinated Universal Time) standard everywhere around the globe.

The Communication Link and Time Frame Delimiter Encoding

The communication links 41 used for the system disclosed is in this invention can be of various types: fiber optic, wireless, etc. The wireless links can be between at least one of a ground station and a satellite, between two satellites orbiting the earth, or between two ground stations, as examples.

Referring to FIG. 9, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, 4B/5B FDDI. In addition to the encoding and decoding of the data transmitted over the serial link, the serial transmitter/receiver (49/31) sends/receives control words for a variety of control purposes, mostly unrelated to the present invention description. However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation. It is necessary to distinguish in an unambiguous manner between the data words, which carry the information, and the control signal or words (e.g., the TFD is a control signal) over the serial link 41. There are many ways to do this.

One way is to use the known 4B/5B encoding scheme (used in FDDI). In this scheme, every 8-bit character is divided into two 4-bit parts and then each part is encoded into a 5-bit codeword that is transmitted over the serial link 41.

FIG. 10 illustrates an encoding table from 4-bit data to 5-bit serial codewords. The 4B/5B is a redundant encoding scheme, which means that there are more codewords than data words. Consequently, some of the unused or redundant serial codewords can be used to convey control information.

FIG. 11 is a table with 15 possible encoded control codewords, which can be used for transferring the time frame delimiter (TFD) over the serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codewords, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

The Input Port

As shown in FIG. 12, the input port 30 has three parts: serial receiver 31, a routing controller 35 and separate queues to the output ports 36. The serial receiver 31 transfers the data packets and the time frame delimiters to the routing controller 35.

The routing controller 35 is constructed of a central processing unit (CPU), a random access memory (RAM) for storing the data packet, read only memory (ROM) for storing the routing controller processing program and the routing table that is used for determining the output port that the incoming data packet should be switched to.

Figure 13:
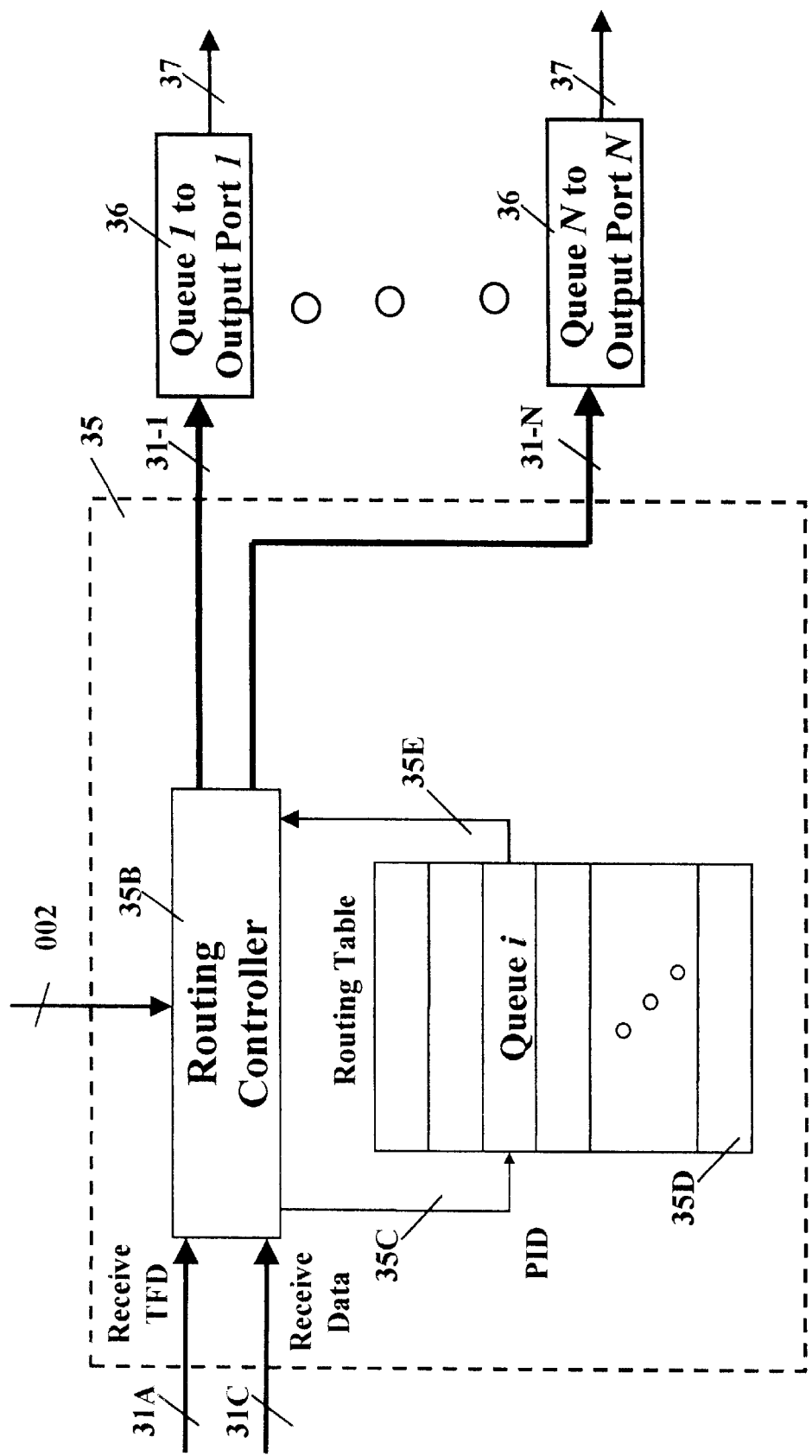
FIG. 13 is a schematic diagram of the routing controller which determines to which output port an incoming data packet should be switched to and attaches the time of arrival (TA) information to the data packet header.
Figure 15A:
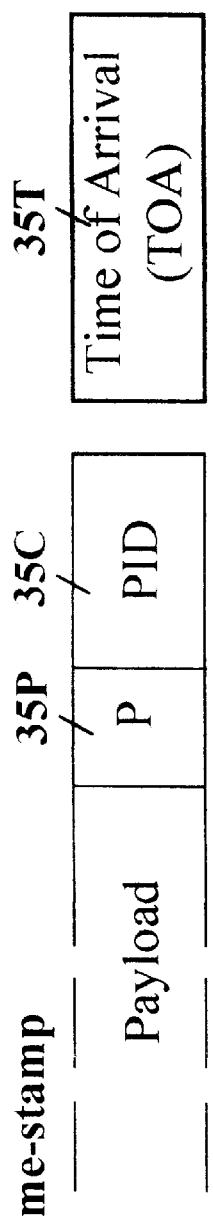
Figure 15B:
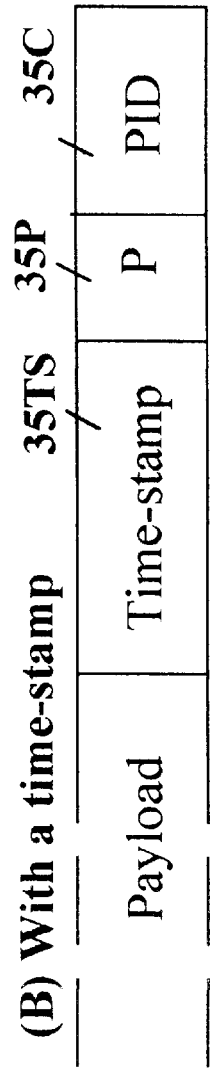

As illustrated in FIG. 13, the incoming data packet header includes a virtual pipe identification, PID 35C, that is used to lookup in the routing table 35D the address 35E of the queue 36 that the incoming data packet should be transferred into. Before the packet is transferred into its queue 36, the time of arrival (TOA) 35T is attached to the packet header as illustrated in FIGS. 15A and 15B. The TOA 35T is used by the scheduling controller 45 of the output port 40 in the computation of the forwarding time out of the output port, and shown in FIG. 16.

The data packet can have various formats, such as, Internet protocol version 4 (IPv4), Internet protocol version 6 (IPv6), asynchronous transfer mode (ATM) cells, etc. The data packets PID can be determined by one of the following: an Internet protocol (IP) address, an asynchronous transfer mode (ATM) a virtual circuit identifier, a virtual path identifier (VCI/VPI), Internet protocol version 6 (IPv6) addresses, Internet MPLS (multi protocol label swapping or tag switching) labels, and IEEE 802 MAC (media access control) address, etc.

Figure 14:
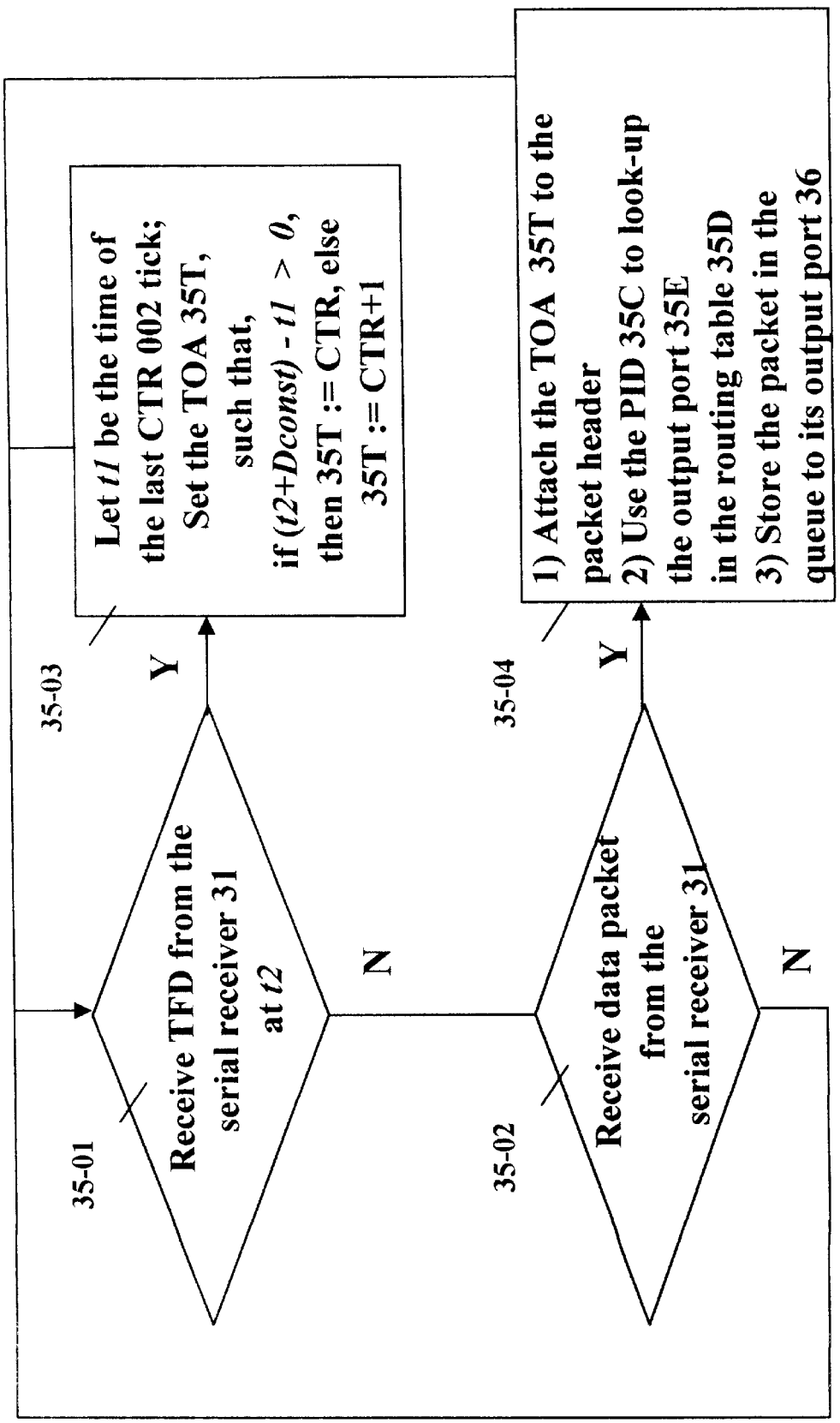
FIG. 14 illustrates the routing controller operation.

FIG. 14 illustrates the flow chart for the router controller 35 processing program executed by the routing controller 35B. The program is responsive to two basic events from the serial receiver 31 of FIG. 12: the receive time frame delimiter TFD at step 35-01, and the receive data packet at step 35-02. After receiving a TFD, the routing controller 35 computes the time of arrival (TOA) 35T value at step 35-03 that is attached to the incoming data packets. For this computation it uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames. When the data packet is received at step 35-02, the routing controller 35B executes three operations as set forth in step 35-04: attach the TOA, lookup the address of the queue 36 using the PID, and storing the data packet in that queue 36.

The Switching Fabric

There are various ways to implement a switching fabric. However, the switching fabric is peripheral to the present invention, and so it will be described only briefly. The main property that the switching fabric should ensure is that packets for which the priority bit P (35P in FIGS. 15A and 15B) is set to high priority (i.e., reserved traffic) will be switched into the output port in a constant bounded delay—measured in time frames.

This is possible in accordance with the present invention, where the packets in the input ports are already separated into queues to their respective output ports. Then, by using the Clos theorem in the time domain (see J. Y. Hui "Switching and Traffic Theory for Integrated Broadband Networks", page 65), the delay can be bounded by two time frames, one time frame at the input port and one time frame to get across the switching fabric. Other implementations can be used, such as based on shared bus with round robin service of the high priority data packets, or on a crossbar switch.

Another possible switch design is shared memory, which ensures a deterministic delay bound from an input port to an output port. Shared memory packet switches are commercially available from various vendors, for example, MMC Networks Inc. (Santa Clara, Calif.).

FIGS. 15A and 15B illustrate data packets without and with a time stamp attached, respectively.

The Output Port

The output port 40 is illustrated in FIG. 16, comprised of a scheduling controller with a transmit buffer 45, and serial transmitter 49 (as previously described herein). The scheduling controller 45 performs a mapping of each of the data packets between the associated respective time of arrival (TOA) and an associated forwarding time out of the output port via the serial transmitter 49. The forwarding time is determined relative to the common time reference (CTR) 002.

Figure 17:
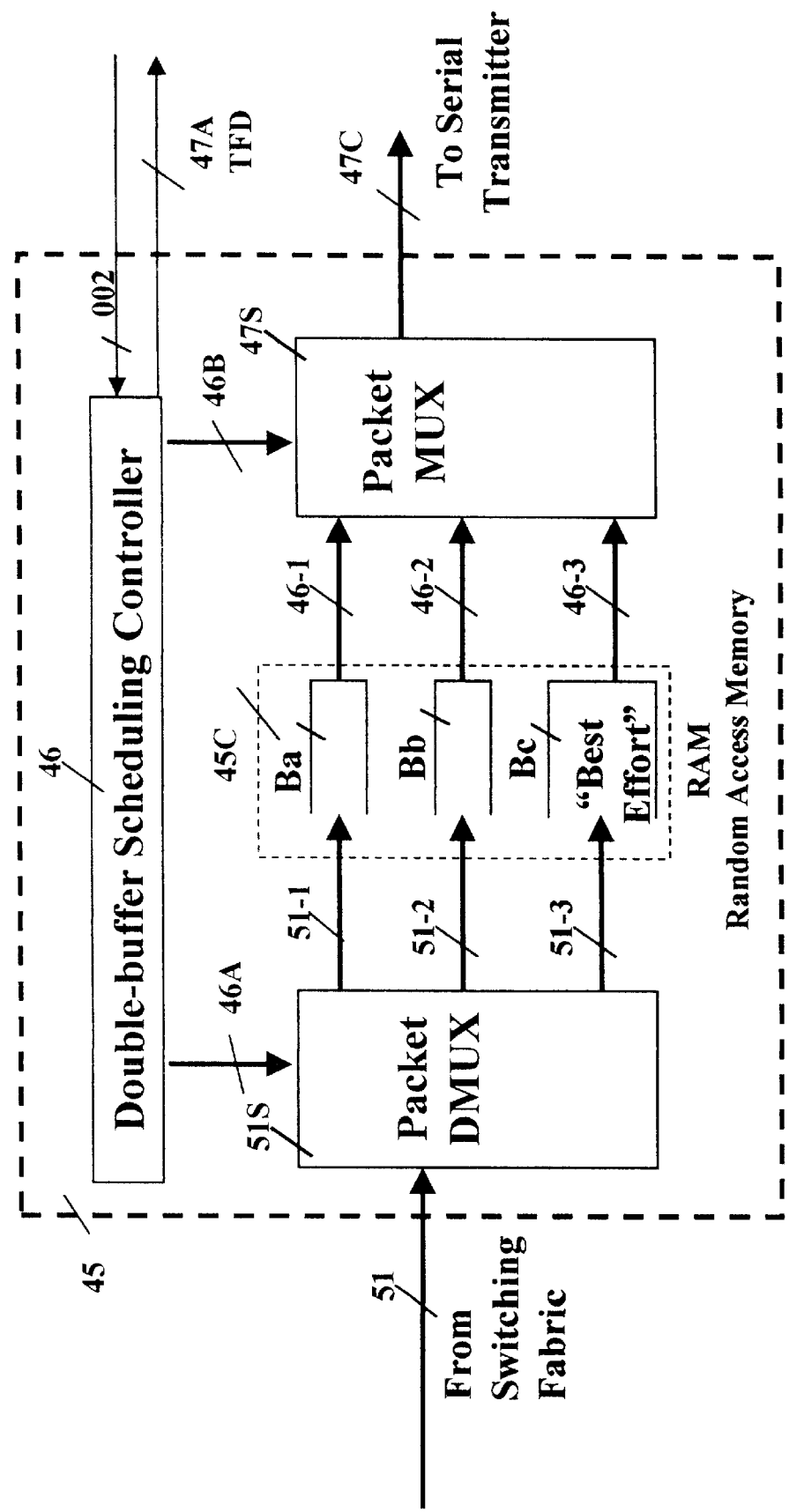
FIG. 17 is a schematic block diagram of the double-buffer scheduling controller.
Figure 18:
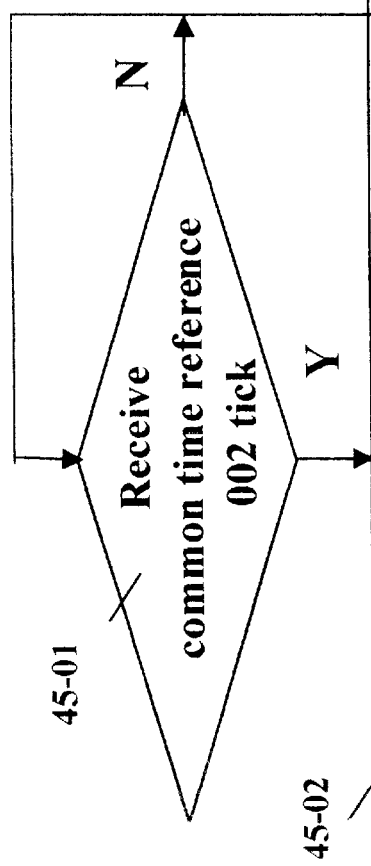
FIG. 18 illustrates the double-buffer scheduling controller 46 operation.
Figure 19:
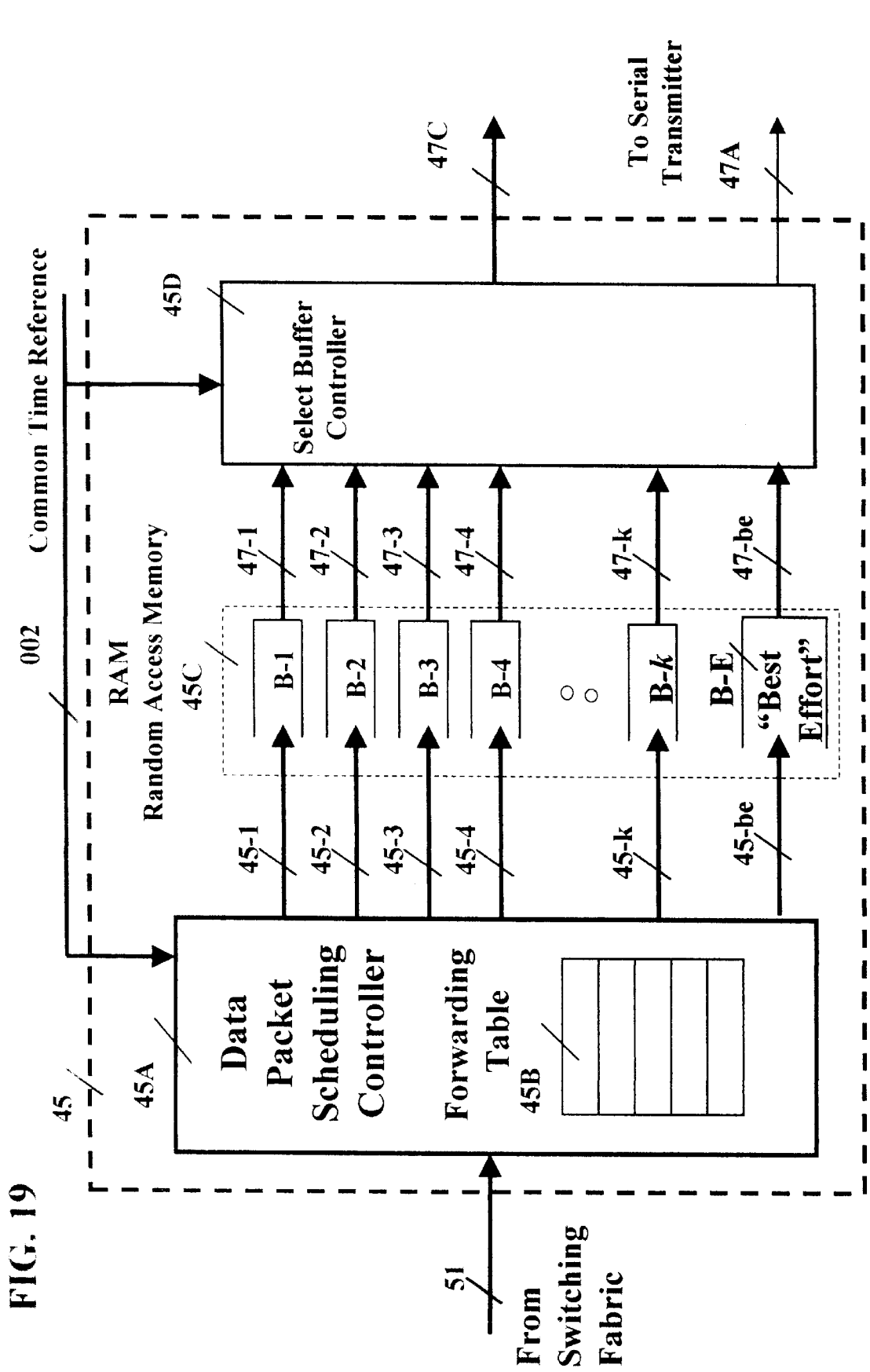
FIG. 19 is a functional block diagram of the general scheduling controller with its transmit buffer and select buffer controller.
Figure 20:
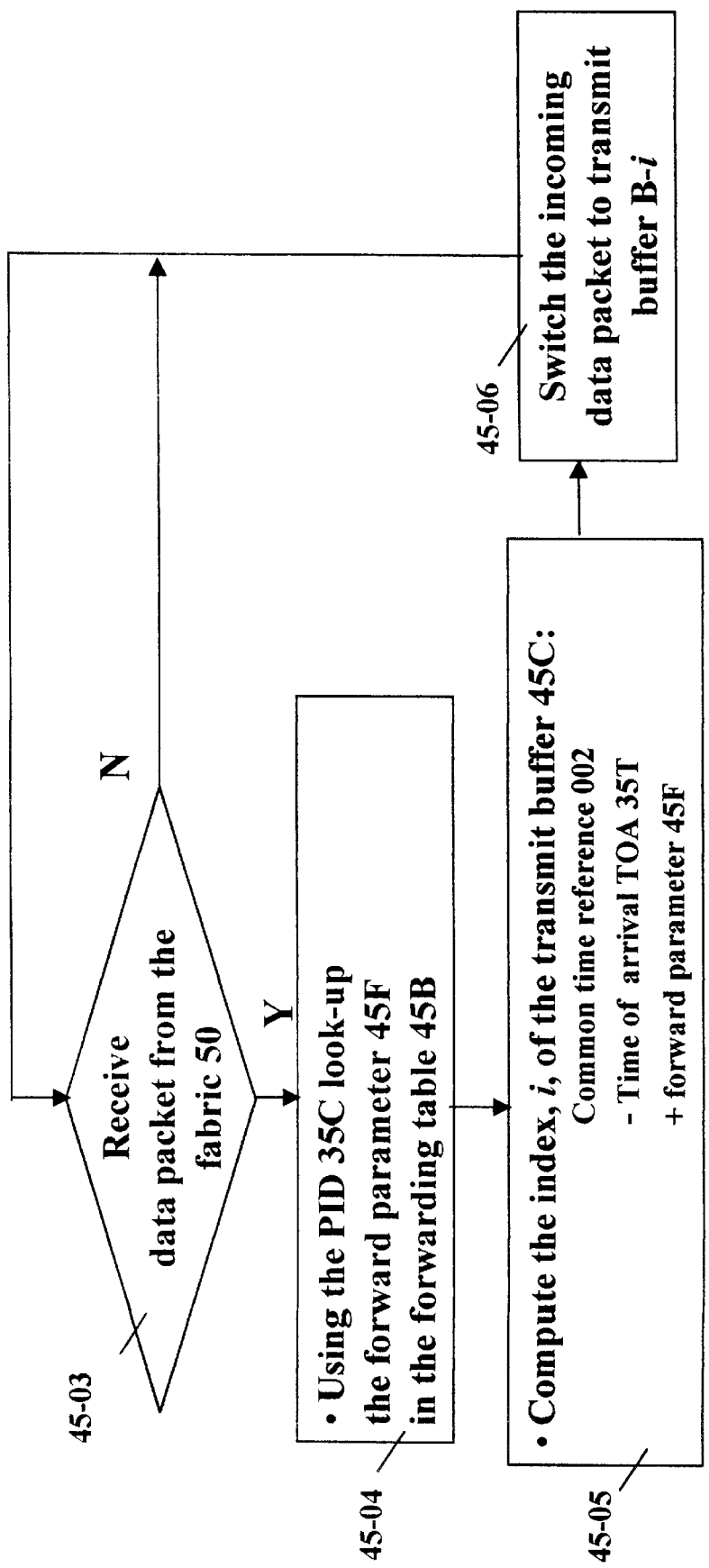
FIG. 20 is a flow diagram describing the packet scheduling controller operation for computing the forwarding time of a packet based on the following input parameters: PID 35C, TOA 35T and the CTR 002.
Figure 21:
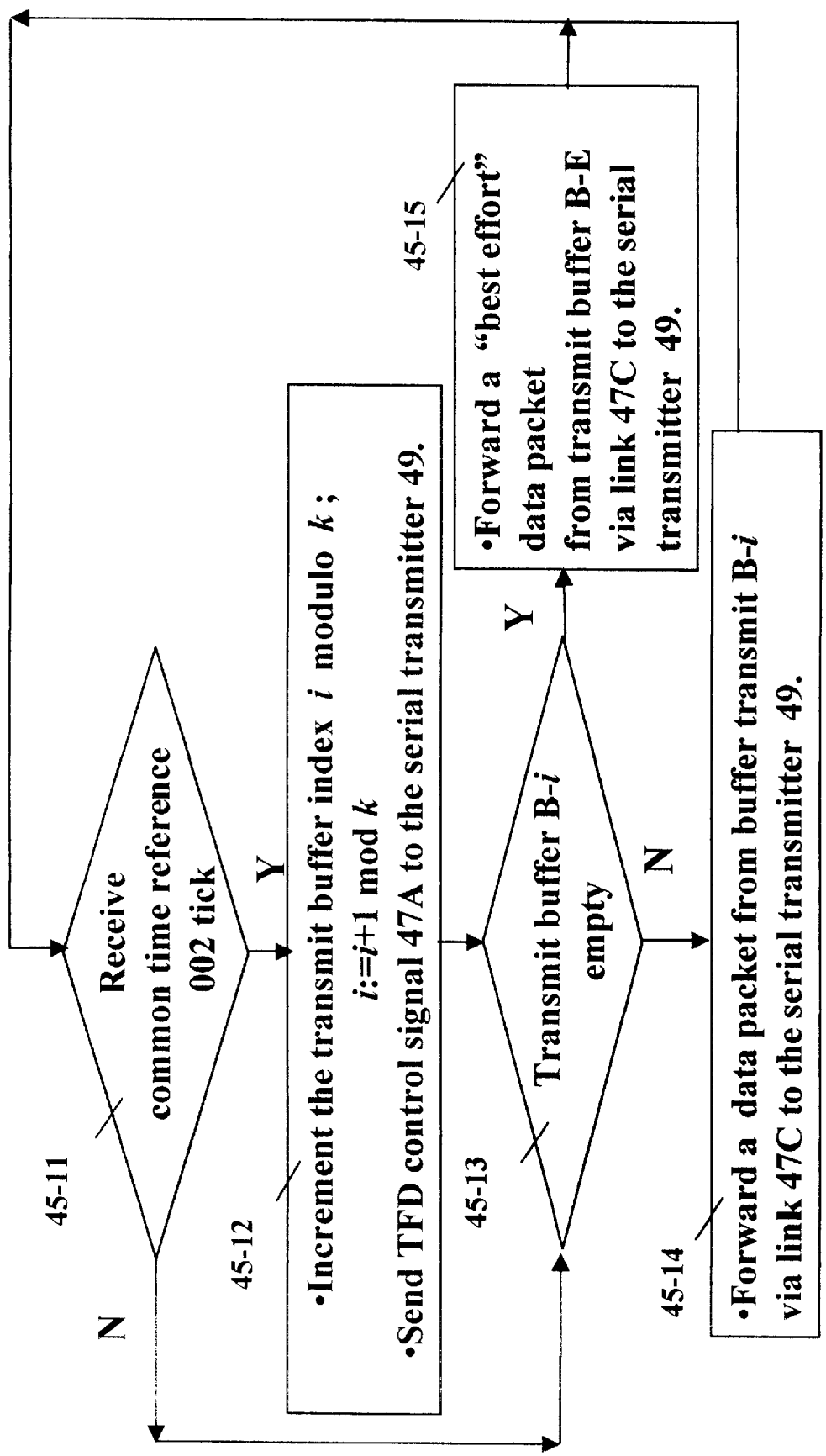
FIG. 21 is a flow diagram illustrating the operation of the Select Buffer Controller 45D.
Figure 22:
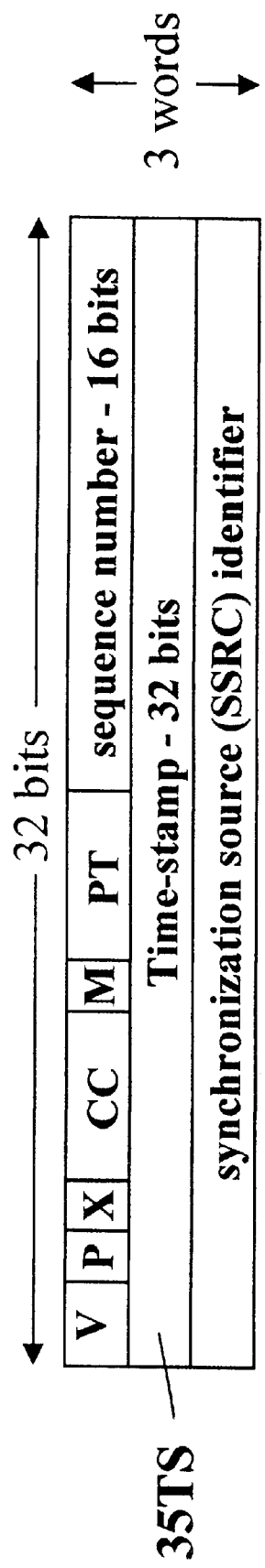
FIG. 22 illustrates the real-time protocol (RTP) packet header with time-stamp field of 32 bits.
Figure 23:
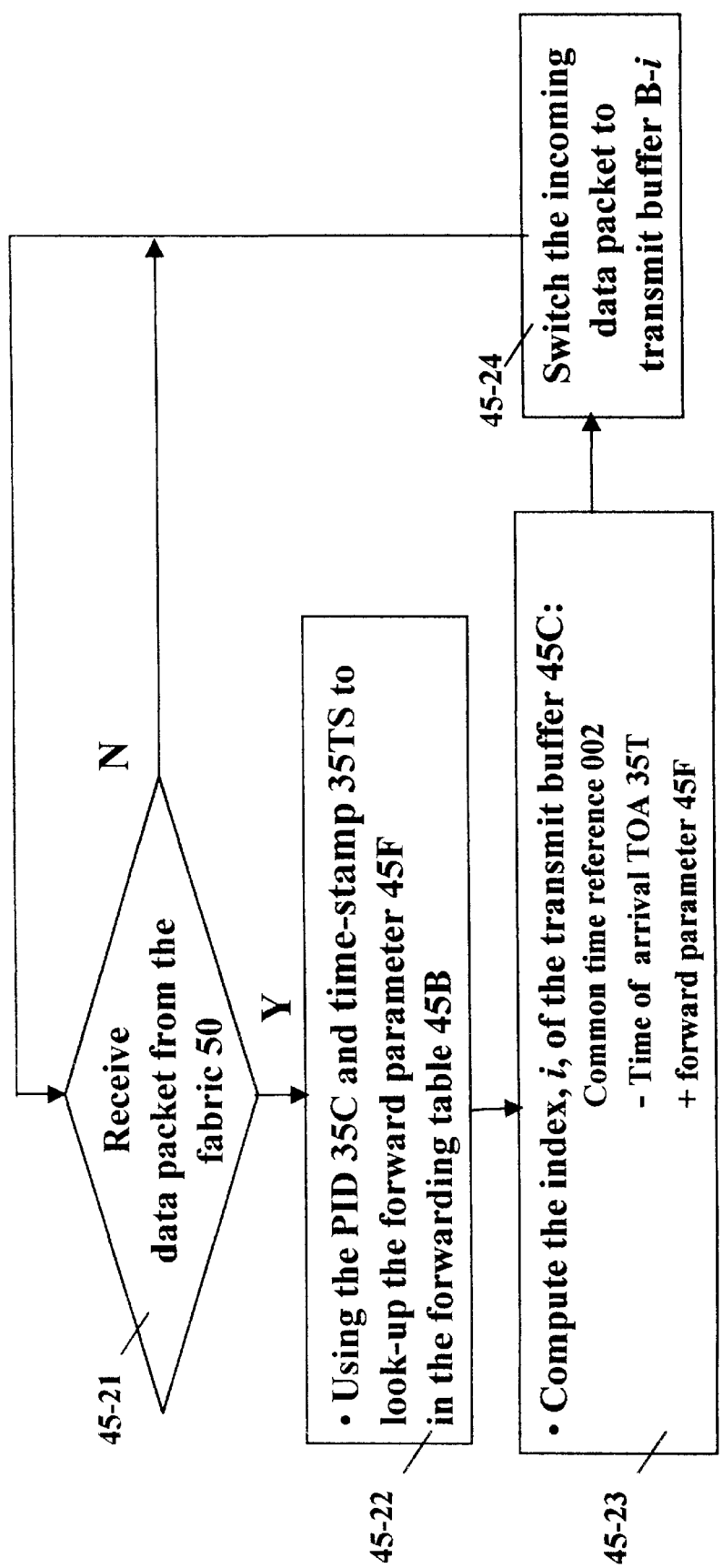
FIG. 23 is a flow diagram describing the packet scheduling controller operation for computing the dispatching-time of a packet based on the following input parameters: PID, TOA, CTR and the RTP time-stamp.

Three output port configurations are illustrated herein: a double-buffer scheduling controller, as shown in FIGS. 17–18, a general scheduling controller, as shown in FIGS. 19–21, and a general scheduling controller with time-stamp, as shown in FIGS. 22–23.

The double-buffer scheduling controller 46, as illustrated in the block diagram of FIG. 17 and flow chart of FIG. 18, is constructed of a central processing unit (CPU), a random access memory (RAM) for storing the data packet, and read only memory (ROM) for storing the controller processing program. It operates in the following manner. Data packets arrive from the switching fabric 50 via link 51. When the priority bit 35P is asserted (i.e., reserved traffic), the packet is switched through the packet DMUX (demultiplexer) 51S (during odd ticks of the common time reference) to buffer Ba via link 51-1, and during even ticks of the common time reference to buffer Bb, via link 51-2. Data packets in which the priority bit 35P is not asserted (i.e., non-reserved traffic) are switched through the packet DMUX (demultiplexer) 51S to the "best effort" buffer Bc via link 51-3. The transmit buffer selection operation is controlled by the select signal 46A, which connects the double-buffer scheduling controller with the packet DMUX (demultiplexer) 51S.

Data packets are forwarded to the serial transmitter 49 through the packet MUX (multiplexer) 47S, and link 47C in FIG. 17, during odd ticks of the common time reference from buffer Bb via link 46-2, and during even ticks of the common time reference from buffer Ba via link 46-1. If during odd ticks of the common time reference buffer Bb is empty, data packets from the "best effort" buffer BC are forwarded to the serial transmitter. If during even ticks of the common time reference buffer Ba is empty, data packets from the "best effort" buffer Bc are forwarded to the serial transmitter. The transmit buffer selection operation is controlled by the select signal 46B, which connects the double-buffer scheduling controller 46 with the packet MUX (multiplexer) 47S.

A more general scheduling controller 45 operation is described in FIGS. 19–21, which includes a transmit buffer 45C and a select buffer controller 45D. The data packet scheduling controller 45A, together with the select buffer controller 45D, perform the mapping, using the PID 35C and the data packet time of arrival (TOA) 35T in order to determine the respective time frame a respective packet should be forwarded out of the output port. Both controllers 45A and 45D are constructed of a central processing unit (CPU), a random access memory (RAM) for storing the data, and read only memory (ROM) for storing the controller processing program.

Data packets arrive from the switching fabric 50 via link 51. Data packets which have the priority bit 35P asserted (i.e., reserved traffic) are switched by the scheduling controller 45A to one of the k transmit buffers 45C (B-1, B-2 . . . , B-k). Each of the k buffers is designated to store packets that will be forwarded in each of the k time frames in every time cycle, as shown in FIG. 5.

The flow chart for the program executed by the scheduling controller is illustrated in FIG. 20. When the data packet is received from the fabric at step 45-03, the PID 35C in the data packet header is used to look-up the forward parameter 45F in the forwarding table (45B of FIG. 19), as specified in step 45-04. Next, the index i of the transmit buffer, between B-1 and B-k, is computed in step 45-05 by subtracting the time of arrival TOA 35T from the common time reference CTR 002 and by adding the forward parameter 45F, and then switching the incoming data packet to transmit buffer B-i, as specified in step 45-06.

Incoming data packets in which the priority bit 35P is not asserted (i.e., non-reserved traffic) are switched by the scheduling controller to the transmit "best effort" buffer B-E via link 45-be.

FIG. 21 illustrates the flow chart for the select buffer controller 45D operation. The controller 45D is responsive to the common time reference (CTR) tick 002, and at step 45-11, increments the transmit buffer index i (i.e., i:=i+1 mod k, where k is the time cycle size in time frames) and sends a time frame delimiter TFD to the serial transmitter at step 45-12. Then, if the transmit buffer B-i is not empty, at step 45-13, it will send a data packet from transmit buffer B-i, as specified in at step 45-14, else it will send a "best effort" data packet from the "best effort" buffer B-be, as specified at step 45-15.

FIGS. 22–23 illustrate a system with a scheduling controller, wherein each of the data packets is comprised of a header, including an associated time stamp. The time-stamp is generated by an Internet real-time protocol (RTP) in which its data packet format is illustrated in FIG. 22. Alternatively, the time-stamp can be generated by a predefined one of the switches 10 in the system, or the time stamp can be generated at a respective end station for inclusion in the respective originated data packet.

FIG. 23 illustrates the operation of the scheduling controller for the case where the packet header contains a time-stamp 35TS. Data packets arrive from the switching fabric 50 via link 51. Data packets in which the priority bit 35P is set (i.e., reserved traffic) are switched by the scheduling controller to one of the k transmit buffers 45C (B–1, B–2, . . . , B-k). Each of the k buffers is designated to store packets that will be forwarded in each of the k time frames in every time cycle, as shown in FIG. 5. The flow chart for the program executed by the scheduling controller is illustrated in FIG. 23. When a data packet is received from the fabric at step 45-21, the PID 35C in the data packet header is used to look-up the forward parameter 45F in the forwarding table 45B, as specified in step 45-22. Next the index i of the transmit buffer, between B-1 and B-k, is computed in step 45-23 by subtracting the time of arrival TOA 35T from the common time reference CTR 002 and by adding the forward parameter 45F, and then switching the incoming data packet to transmit buffer B-i, as specified in step 45-24.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for scheduling and managing data transfer of data packets from at least one source to at least one destination, wherein the transfer of the data packets is provided during respective ones of a plurality of predefined time intervals, wherein each of the predefined time intervals is comprised of a plurality of predefined time frames, said system comprising:

a plurality of switches;

a virtual pipe comprising at least two of the switches interconnected via communication links in a path;

a common time reference signal coupled to each of the switches;

a time assigned controller for assigning selected predefined time frames for transfer into and out from each of the respective switches responsive to the common time reference signal;

wherein for each switch within the virtual pipe there is a first predefined time frame within which a respective data packet is transferred into the respective switch, and a second predefined time frame within which the respective data packet is forwarded out of the respective switch; and wherein the time assignment provides consistent fixed intervals between the time between the input to and output from the virtual pipe.

2. The system as in claim 1, wherein the position of said data packet in said second predefined time frame is arbitrary.

3. The system as in claim 1, wherein for each of the respective switches, there are a predefined subset of the predefined time frames during which the data packets are transferred into the switch, and wherein for each of the respective switches, there are a predefined subset of the predefined time frames during which the data packets are transferred out of the switch.

4. The system as in claim 3, wherein each of the switches is comprised of a plurality of addressable input and output ports, the system further comprising a routing controller for mapping each of the data packets that arrives at each one of the input ports of the respective switch to a respective one or more of the output ports of the respective switch.

5. The system as in claim 4, further comprising a scheduling controller, wherein for each of the data packets there is an associated time of arrival to a respective one of the input ports, wherein the time of arrival is associated with a particular one of the predefined time frames, wherein for each of the mappings by the routing controller, there is an associated mapping by the scheduling controller, wherein the scheduling controller provides for mapping of each of the data packets between the associated respective time of arrival and an associated forwarding time out, wherein the forwarding time out is associated with a specified one of the predefined time frames.

6. The system as in claim 5, wherein there is a fixed time difference between the time frames for the associated time of arrival and forwarding time out for each of the respective ones of the data packets.

7. The system as in claim 6, wherein the fixed time difference is constant for all the switches.

8. The system as in claim 6, wherein the fixed time difference is a variable time difference for at least some of the switches.

9. The system as in claim 5, further comprising: a select buffer controller for mapping a respective one of the time frames for output from a first one of the switches to a second respective one of the time frames for input via the communications link to a second one of the switches.

10. The system as in claim 9, wherein each of the data packets is encoded as a stream of data, wherein a time frame delimiter is inserted into the stream of data responsive to the select buffer controller.

11. The system as in claim 4, wherein the routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses for mapping from said input port to said output port.

12. The system as in claim 4, further comprising a scheduling controller, wherein each of the data packets is comprised of a header, including an associated time stamp, wherein for each of the mappings by the routing controller, there is an associated mapping by the scheduling controller, wherein the scheduling controller provides for mapping of each of the data packets between the respective associated time-stamp and an associated forwarding time out, wherein the forwarding time out is associated with one of the predefined time frames.

13. The system as in claim 12, wherein the time-stamp is generated by an Internet real-time protocol (RTP).

14. The system as in claim 12, wherein the time-stamp is generated by a predefined one of the switches.

15. The system as in claim 12, wherein each of the data packets is originated from an end station, wherein the time-stamp is generated at the respective end station for inclusion in the respective originated data packet.

16. The system as in claim 1, wherein a synchronization envelope is associated with the common time reference, wherein two adjacent synchronization envelopes of two adjacent time frames are non-overlapping.

17. The system as in claim 1, wherein there are a plurality of the virtual pipes, each of the virtual pipes comprising at least two of the switches interconnected via communication links in a path.

18. The system as in claim 17, wherein the communication link is a connection between two adjacent ones of the switches; and wherein each of the communications links can be used simultaneously by at least two of the virtual pipes.

19. The system as in claim 17, wherein for each of the same predefined time frames, multiple data packets can be transferred utilizing at least two of the virtual pipes.

20. The system as in claim 1, wherein the predefined interval is comprised of a fixed number of contiguous time frames comprising a time cycle.

21. The system as in claim 20, wherein the time cycles are contiguous.

22. The system as in claim 21, wherein a fixed number of a plurality of contiguous ones of the time cycles comprise a super cycle; wherein the super cycle is periodic.

23. The system as in claim 22, wherein the super cycle duration is equal to one second as measured using the UTC (Coordinated Universal Time) standard.

24. The system as in claim 20, wherein the time frames associated with a particular one of the switches within the virtual pipe are associated with the same respective switches for all the time cycles.

25. The system as in claim 24, wherein the time frames associated with said particular one of the switches are associated with one of input into or output from said particular respective switch.

26. The system as in claim 24, wherein there is a constant fixed time between the input into and output from a respective one of the switches for each of the time frames within each of the time cycles.

27. The system as in claim 1, wherein the common time reference signal is coupled from a GPS (Global Positioning System).

28. The system as in claim 1, wherein the common time reference signal is in accordance with the UTC (Coordinated Universal Time) standard.

29. The system as in claim 1, wherein the communication links are at least one of fiber optic, copper, and wireless communication links.

30. The system as in claim 1, wherein the communication links are wireless communication links between at least one of a ground station and a satellite and between two satellites orbiting the earth.

31. The system as in claim 1, wherein the data packets are at least one of Internet protocol (IP) data packets, and asynchronous transfer mode (ATM) cells.

32. The system as in claim 1, wherein the data packets forwarded over the same virtual pipe each have one or more associated pipe identifications (PIDs).

33. The system as in claim 32, wherein the PID is at least one of an Internet protocol (IP) address, Internet protocol group multicast address, an asynchronous transfer mode (ATM), a virtual circuit identifier (VCI), a virtual path identifier (VPI), used in combination as VCI/VPI, and Internet protocol (IP) address together with an IP port number.

34. A system for switching data packets from at least one source to at least one destination, wherein the transfer of the data packets is provided during respective ones of a plurality of predefined time intervals, wherein each of the predefined time intervals is comprised of a plurality of predefined time frames, said system comprising:
   a plurality of switches with plurality of input and output ports;
   a common time reference signal coupled to each of the switches;
   wherein the common time reference is partitioned into time frames;
   wherein a predefined number of contiguous time frames are grouped into a time cycle;
   wherein a predefined number of contiguous time cycles are grouped into a super cycle;
   a routing controller for determining the mapping, for each of the input ports as to which one or more of the plurality of output ports, respective data packets will be forwarded to, and for attaching a time of arrival (TOA) to incoming data packets;
   a scheduling controller for assigning selected predefined time frames for transfer into and out from each of the respective switches responsive to the time of arrival, the unique identity of the input port, and the PID in the data packet header; and
   wherein for each switch there is a first predefined time frame within which a respective data packet is transferred into the respective switch, and a second predefined time frame within which the respective data packet is forwarded out of the respective switch.

35. The system as in claim 34, wherein the position of said data packet in said second predefined time frame is arbitrary.

36. The system as in claim 34,
   wherein a synchronization envelope is associated with the common time reference,
   wherein two adjacent synchronization envelopes of two adjacent time frames are non-overlapping.

37. The system as in claim 34,
   wherein the time of arrival reflects a UTC (Coordinated Universal Time) time and is represented as a time frame number within a time cycle and as a time cycle number within a super cycle.

38. The system as in claim 37,
   wherein the super cycle duration is equal to a predefined number of seconds as measured using the UTC standard.

39. The system as in claim 37,
   wherein the super cycle duration is equal to a predefined fraction of a second measured using the UTC (Coordinated Universal Time) standard.

40. The system as in claim 34,
   wherein the second predefined time frame within which the respective data packet is forwarded out of the respective switch is determined responsive to UTC and PID.

41. The system as in claim 34,
   wherein for each switch there is a predefined time difference, measured in time frames, between the first predefined time frame within which a respective data packet is transferred into the input port of respective switch and a second predefined time frame within which the respective data packet is forwarded out of the output port of respective switch.

42. The system as in claim 41,
   wherein for each switch the predefined time difference is a constant number.

43. The system as in claim 41,
   wherein for each switch the predefined time difference is predefined for each PID in the data packet header.

44. The system as in claim 41,
   wherein for each switch the predefined time difference is predefined for each of the time frame within a time cycle and as PID in the data packet header.

45. The system as in claim 41,
   wherein for each switch the predefined time difference is predefined for each of the time frames within a time cycle, the time cycle within the super cycle and the PID in the data packet header.

46. The system as in claim 34,
   wherein the second predefined time frame within which the respective data packet is forwarded out of the respective switch is determined responsive to UTC; and
   wherein PID is representative of an IP address and an IP port number.

47. The system as in claim 46,
   wherein when there are no scheduled data packets to be transmitted in a time frame, "best effort" data packets are transmitted.

48. A system for scheduling data packets on a switch comprised of plurality of input ports and plurality of output ports, wherein the transfer of the data packets is provided during respective ones of a plurality of predefined time intervals, wherein each of the predefined time intervals is comprised of a plurality of predefined time frames, said system comprising:
   a common time reference signal coupled to each of the switches;
   wherein the common time reference is partitioned into time frames;
   wherein a predefined number of contiguous k time frames are grouped into a time cycle; wherein k is at least 1;
   wherein a predefined number of contiguous l time cycles are grouped into a super cycle; wherein l is at least 1;
   a routing controller with a routing table for selecting at least one output port that said data packets will be forwarded to;
   wherein the routing controller attaches a time of arrival (TOA) to incoming data packets at the input port;
   wherein the time of arrival relates to the common time reference and is represented as a time frame number within a time cycle and as a time cycle number within a super cycle;
   a switching fabric;
   a data packet scheduling controller;
   a memory partitioned into plurality of buffers;
   a select buffer controller for selecting one of the plurality of buffers.

49. The system as in claim 48,
   wherein the data packet scheduling controller is responsive to the reception of a data packet from the switching fabric and assigns a selected predefined time frame for transferring said data packet out from the said switch responsive to at least one of the time of arrival attached to the respective data packet by the routing controller, the unique identity of the respective input port, and the PID in the data packet header.

50. The system as in claim 48, wherein when there are no scheduled data packet to be transmitted in a time frame, "best effort" data packets are transmitted.

51. The system as in claim 48, wherein between every two successive time frames the select buffer controller sends a time frame delimiter (TFD) signal.

52. The system as in claim 51, wherein the time frame delimiter can be sent as an encoded control codeword in the middle of a data packet without adversely affecting the transmission of said data packet.

53. The system as in claim 52, wherein all data packets received between two successive time frame delimiters (TFDs), which were received by the routing controller, are uniquely associated with the time frame as measured by the common time reference.

54. The system as in claim 48, wherein the memory is partitioned into three buffers;

wherein a first buffer stores data packets to be forwarded from said switch during odd time frames as measured by the common time reference;

wherein a second buffer stores data packets to be forwarded from said switch during even time frames as measured by the common time reference;

wherein a third buffer stores "best effort" data packets to be forwarded from said switch during one of the odd and even time frames, whenever the respective first and second buffers are empty.

55. The system as in claim 48, wherein the memory is partitioned into k+1 buffers;

wherein a first k buffers provides for storing data packets to be forwarded from said switch during one of the k time frames in each of said time cycle, as were measured by the common time reference;

wherein a k+1 buffer provides for storing "best effort" data packets.

56. The system as in claim 55, wherein in each of the k time frames of the time cycle, the select buffer controller forwards data packets from the corresponding one of the k buffers;

wherein when any of said other k buffers are empty, said select buffer controller forwards out of said switch "best effort" data packets from the k+1 buffer.

57. The system as in claim 48, wherein the memory is partitioned into buffers;

wherein first (l times k) buffers provide for storing data packets to be forwarded from said switch during one of the (l times k) time frames in each of said super cycle, as were measured by the common time reference;

wherein the buffer provides for storing "best effort" data packets.

58. The system as in claim 57, wherein in each of the (l times k) time frames of the super cycle, the select buffer controller forwards data packets from the respective corresponding one of the (l times k) buffers;

wherein when all other ones of said buffers are empty, said select buffer controller forwards out of said switch "best effort" data packets from said buffer.

59. The system as in claim 48, wherein between every two successive time cycles the select buffer controller sends a second type of time frame delimiter (TFD) signal.

60. The system as in claim 48, wherein between every super cycle the select buffer controller sends a third type of time frame delimiter (TFD) signal.

61. A system for switching data packets from at least one source to at least one destination, wherein the transfer of the data packets is provided during respective ones of a plurality of predefined time intervals, wherein each of the predefined time intervals is comprised of a plurality of predefined time frames, said system comprising:

a plurality of switches each with a plurality of input and output ports;

a common time reference signal coupled to each of the switches;

wherein the common time reference signal is periodic and is partitioned into time frames;

wherein a predefined number of contiguous time frames are grouped into a time cycle;

wherein a predefined number of contiguous time cycles are grouped into a super cycle;

a routing controller for determining uniquely an output port for coupling of the data packets from a respective one of the input ports responsive to a PID in the data packet header;

a scheduling controller for assigning a selected predefined time frame for transfer out of a respective one of the data packets from each of the respective switches, responsive to at least one of the time stamp, the unique identity of the input port, and the PID in the data packet header.

62. The system as in claim 61, wherein when there are no scheduled data packet to be transmitted in a time frame, "best effort" data packets are transmitted.

63. The system as in claim 61, wherein the scheduling controller provides for mapping of transfer out time to respective data packets by maintaining a forwarding table.

64. The system as in claim 63, wherein the predefined time frame for transferring the data packet out from each of said switches is determined by adding a predefined number of time frames to the time stamp value in the data packet header.

65. The system as in claim 64, wherein the number of predefined time frames added to the time stamp value, in order to determine transferring time frame of said data packet out from said switch, is determined by looking this number up in the forwarding table in the scheduling controller using the PID in the data packet header as an index to said table.

66. The system as in claim 61, wherein the PID is at least one of an Internet protocol (IP) address, Internet protocol group multicast address, an asynchronous transfer mode (ATM), a virtual circuit identifier (VCI), a virtual path identifier (VPI), used in combination as VCI/VPI, and Internet protocol (IP) address together with an IP port number.

67. A method for scheduling and managing data transfer of data packets among a plurality of switches from at least one source to at least one destination, wherein the transfer of the data packets is provided during respective ones of a plurality of predefined time intervals, wherein each of the predefined time intervals is comprised of a plurality of predefined time frames, said method comprising:

constructing a virtual pipe comprising at least two of the switches interconnected via communication links in a path;

providing a common time reference signal coupled to each of the switches; assigning time assignment for selected predefined time frames for transfer into and out from each of the respective switches responsive to the common time reference signal;

transferring in the respective switch during a first predefined time frame for each switch within the virtual pipe, forwarding the respective data packet out of the respective switch during a second predefined time frame; and providing consistent fixed intervals between the time between the input to and output from the virtual pipe responsive to the time assignment.

68. The method as in claim 67, wherein the position of said data packet in said second predefined time frame is arbitrary.

69. The method as in claim 67, further comprising:

providing a predefined subset of the predefined time frames during which the data packets are transferred into the switch for each of the respective switches, and transferring during a predefined subset of the predefined time frames during which the data packets which are transferred out of the switch for each of the respective switches.

70. The method as in claim 69, wherein each of the switches is comprised of a plurality of addressable input and output ports, the method further comprising:

mapping each of the data packets that arrives at each one of the input ports of the respective switch to a respective one or more of the output ports of the respective switch.

71. The method as in claim 70, further comprising:

associating a time of arrival to a respective one of the input ports for each of the data packets, associating a particular one of the predefined time frames with the time of arrival, for mapping of each of the data packets between the associated respective time of arrival and an associated forwarding time out for each of the mappings, and associating the forwarding time out with a specified one of the predefined time frame responsive to the mapping.

72. The method as in claim 67, wherein the predefined interval is comprised of a fixed number of contiguous time frames comprising a time cycle, wherein the time cycles are contiguous.

73. The method as in claim 72, wherein a fixed number of a plurality of contiguous ones of the time cycles comprise a super cycle;

wherein the super cycle is periodic.

74. The method as in claim 73, wherein the super cycle duration is equal to one second as measured using the UTC (Coordinated Universal Time) standard.

75. The method as in claim 67, wherein the common time reference signal is coupled from a GPS (Global Positioning System).

76. The method as in claim 67, wherein the common time reference signal is in accordance with the UTC (Coordinated Universal Time) standard.

\* \* \* \* \*